United States Patent
Landis et al.

(10) Patent No.: US 11,750,308 B2
(45) Date of Patent: Sep. 5, 2023

(54) INTERFERENCE MANAGEMENT TECHNIQUES

(71) Applicant: QUALCOMM Incorporated, San Diego, CA (US)

(72) Inventors: Shay Landis, Hod Hasharon (IL); Guy Wolf, Rosh Haayin (IL); Assaf Touboul, Netanya (IL); David Yunusov, Holon (IL); Peer Berger, Hod Hasharon (IL); Michael Levitsky, Rehovot (IL); Ran Berliner, Kfar-Aviv (IL); Sharon Levy, Binyamina (IL); Noam Zach, Kiryat Ono (IL)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 17/116,910

(22) Filed: Dec. 9, 2020

(65) Prior Publication Data
US 2022/0182161 A1    Jun. 9, 2022

(51) Int. Cl.
*H04B 17/373* (2015.01)
*H04B 17/382* (2015.01)
(Continued)

(52) U.S. Cl.
CPC ......... *H04B 17/373* (2015.01); *H04B 17/382* (2015.01); *H04W 16/14* (2013.01); *H04W 16/22* (2013.01); *H04W 72/0453* (2013.01)

(58) Field of Classification Search
CPC ... H04B 17/373; H04B 17/382; H04W 16/14; H04W 16/22; H04W 27/0453
See application file for complete search history.

(56) References Cited

U.S. PATENT DOCUMENTS

2013/0311140 A1* 11/2013 Schechter ........... H04W 80/085
702/188
2014/0185516 A1* 7/2014 Rubin ................... H04J 11/005
370/315

(Continued)

FOREIGN PATENT DOCUMENTS

| EP | 3714626 A1 | 9/2020 | |
| WO | WO-2011116709 A1 * | 9/2011 | ............. H04L 12/12 |
| WO | 2020166411 A1 | 8/2020 | |

OTHER PUBLICATIONS

International Search Report and Written Opinion—PCT/US2021/072727—ISA/EPO—dated Jun. 29, 2022.

(Continued)

*Primary Examiner* — Duc C Ho
(74) *Attorney, Agent, or Firm* — Muncy, Geissler, Olds, & Lowe, P.C.

(57) ABSTRACT

Disclosed are techniques for wireless communication. In some aspects, a base station (BS) may determine a first planned transmit beam configuration of the first BS. The BS may obtain a second planned transmit beam configuration of a second BS. The BS may determine that a first planned transmit beam of the first planned transmit beam configuration will interfere with a second planned transmit beam of the second planned transmit beam configuration. The BS may modify the first planned transmit beam, the second planned transmit beam, or both, based on the interference determination.

34 Claims, 15 Drawing Sheets

(51) Int. Cl.
*H04W 16/14* (2009.01)
*H04W 16/22* (2009.01)
*H04W 72/0453* (2023.01)

(56) References Cited

U.S. PATENT DOCUMENTS

| | | |
|---|---|---|
| 2016/0242059 A1* | 8/2016 | Lopes .................... H04W 24/10 |
| 2017/0142605 A1* | 5/2017 | Cheng .................. H04B 7/0617 |
| 2019/0253986 A1* | 8/2019 | Jeon ..................... H04W 72/042 |
| 2019/0335379 A1* | 10/2019 | Joseph ................... H04L 1/189 |
| 2019/0364445 A1* | 11/2019 | Kang .................... H04B 7/0639 |
| 2020/0044722 A1* | 2/2020 | Yu ......................... H04W 16/28 |
| 2020/0076488 A1 | 3/2020 | Brunel |
| 2020/0145079 A1* | 5/2020 | Marinier ............... H04L 5/0051 |
| 2020/0150263 A1 | 5/2020 | Eitan et al. |
| 2022/0121691 A1* | 4/2022 | Barathi .................. G07C 5/008 |

OTHER PUBLICATIONS

Partial International Search Report—PCT/US2021/072727—ISA/EPO—dated Mar. 29, 2022.

* cited by examiner

INTERFERENCE MANAGEMENT TECHNIQUES

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Fifth generation (5G) communications in millimeter wave (mmw) frequencies has a shorter transmission range compared to longer wavelength transmissions. To counteract this phenomenon, beamforming is used to create a directional, rather than omnidirectional transmission. While each base station (BS), such as a gNodeB (gNB), chooses the best beam to use to communicate with a user equipment (UE), conventional base stations do not consider the potential interference from a directional beam transmitted by another base station, nor do conventional base stations consider potential interference caused by features in the environment, such as buildings, traffic, topological features, etc.

To address these deficiencies, a number of NR interference management techniques are presented. One technique includes sharing planned transmit beam configurations among base stations, so that potential interference between planned transmit beams can be detected and mitigated. Another technique includes the use of information about the local environment when determining a planned transmit beam configuration, as part of an interference mitigation effort, or both. Yet another technique is to provide a mechanism by which a BS can query a UE to determine what environment information the UE can provide from its sensors and by which the BS can request such information from the UE. These techniques may be used singly or in any combination.

In some implementations, a method of wireless communication performed by a BS includes determining a first planned transmit beam configuration of the first BS; obtaining a second planned transmit beam configuration of a second BS; determining that a first planned transmit beam of the first planned transmit beam configuration will interfere with a second planned transmit beam of the second planned transmit beam configuration; and modifying the first planned transmit beam, the second planned transmit beam, or both, based on the interference determination.

In some implementations, a method of wireless communication performed by a first BS includes sending, to a second BS, a first planned transmit beam configuration of the first BS; receiving, from the second BS, a request to modify a first planned transmit beam of the first planned transmit beam configuration; and modifying the first planned transmit beam according to the request.

In some implementations, a method of wireless communication performed by a BS includes obtaining environment data collected from sensors associated with the BS; determining, based on the environment data, interference of a planned transmit beam caused by environmental features; and modifying the planned transmit beam to reduce or eliminate the interference of the planned transmit beam caused by the environmental features.

In some implementations, a method of wireless communication performed by a UE includes receiving, from a requesting entity, a request to report capabilities of the UE; reporting, to the requesting entity, capabilities of the UE to provide environment data collected from sensors; receiving, from the requesting entity, a request for environment data collected from sensors; and providing, to the requesting entity, the requested environment data collected from sensors.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
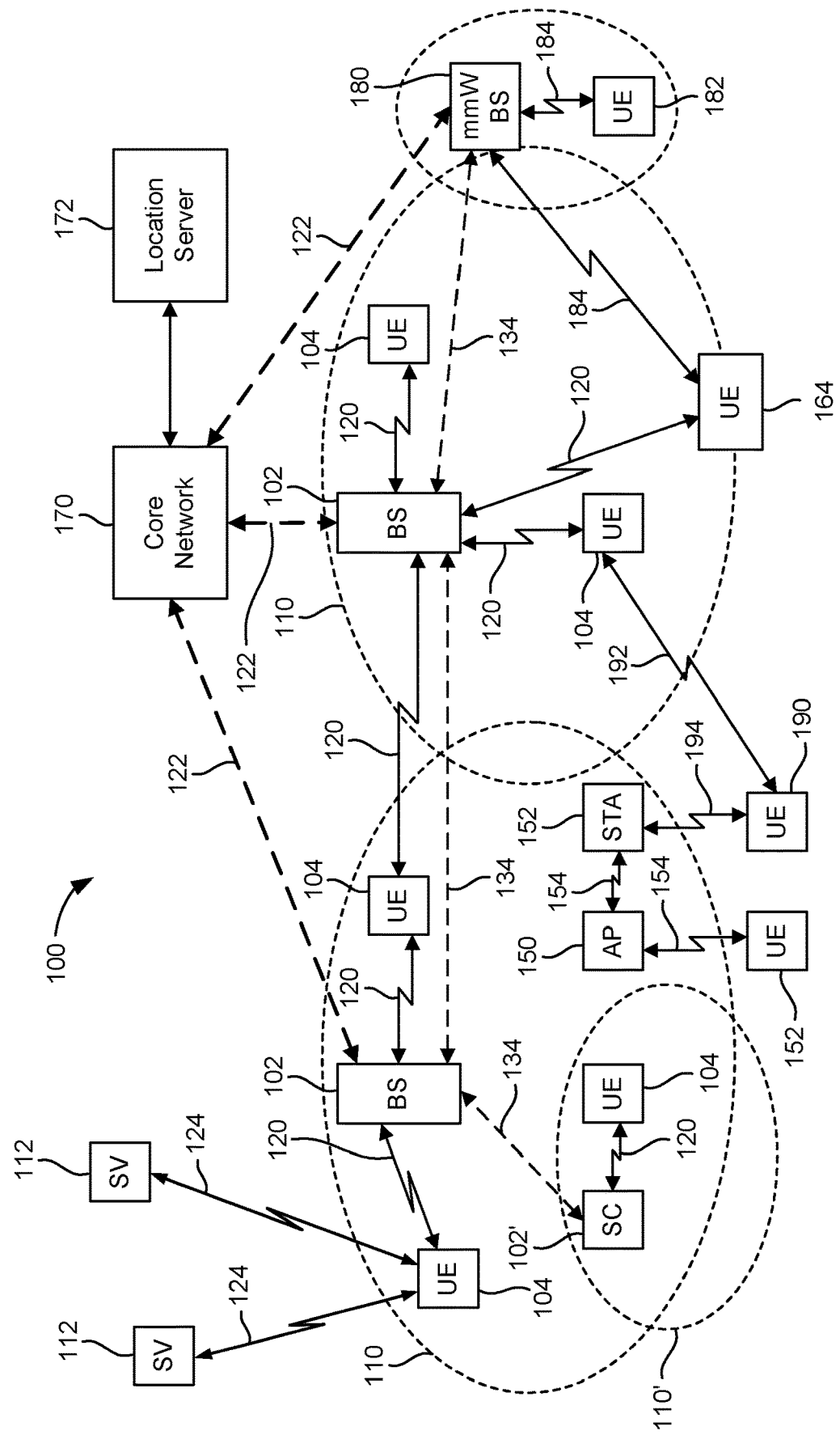
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell (SC) base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a target reference RF signal on a target beam can be derived from information about a source reference RF signal on a source beam. If the source reference RF signal is QCL Type A, the receiver can use the source reference RF signal to estimate the Doppler shift, Doppler spread, average delay, and delay spread of a target reference RF signal transmitted on the same channel. If the source reference RF signal is QCL Type B, the receiver can use the source reference RF signal to estimate the Doppler shift and Doppler spread of a target reference RF signal transmitted on the same channel. If the source reference RF signal is QCL Type C, the receiver can use the source reference RF signal to estimate the Doppler shift and average delay of a target reference RF signal transmitted on the same channel. If the source reference RF signal is QCL Type D, the receiver can use the source reference RF signal to estimate the spatial receive parameter of a target reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. In some cases, the secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive signals for deriving geo location information from the SVs 112. An SPS typically includes a system of transmitters (e.g., SVs 112) positioned to enable receivers (e.g., UEs 104) to determine their location on or above the Earth based, at least in part, on signals 124 received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104.

The use of SPS signals can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals may include SPS, SPS-like, and/or other signals associated with such one or more SPS.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
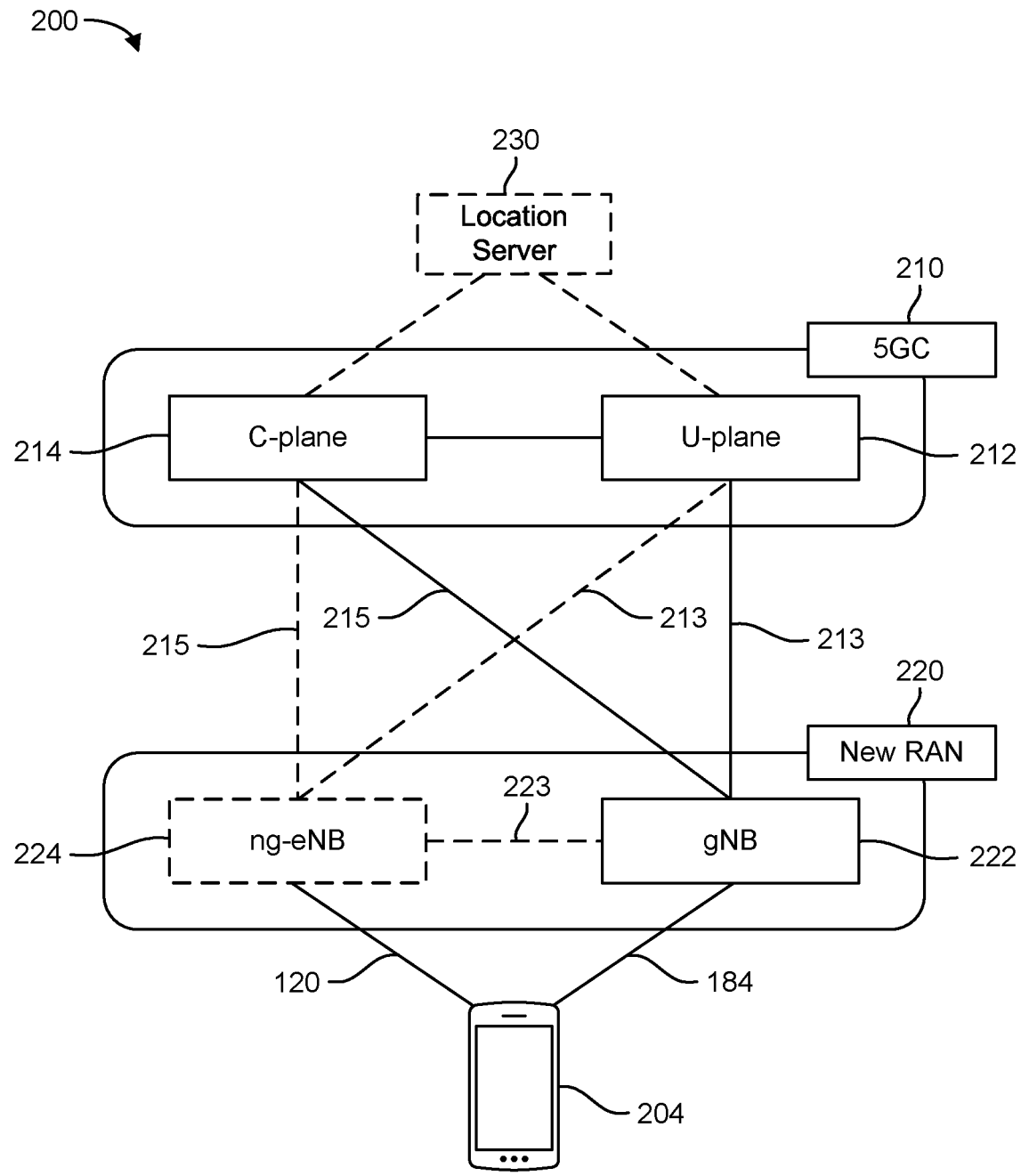
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
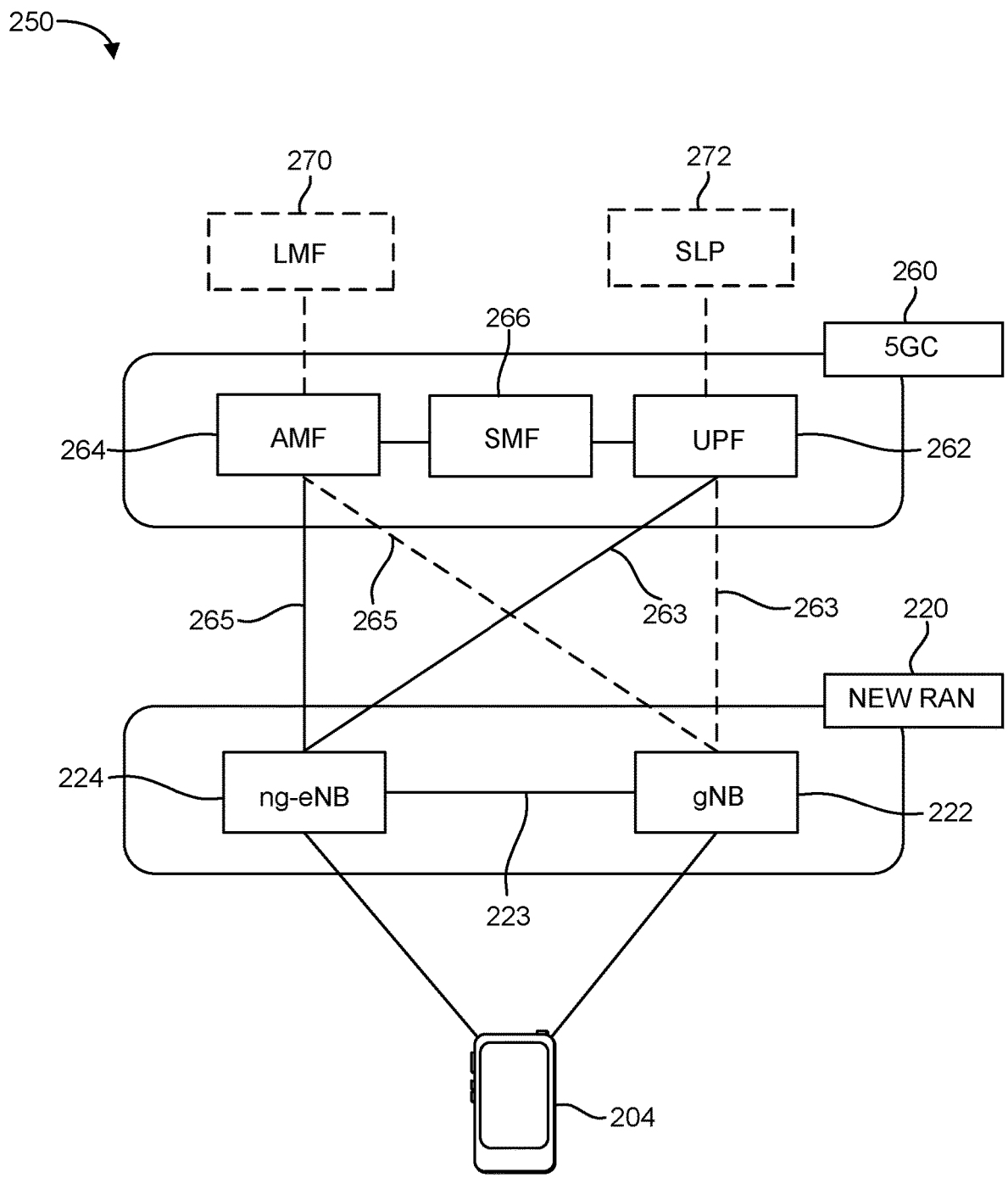

FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

Figure 3A:
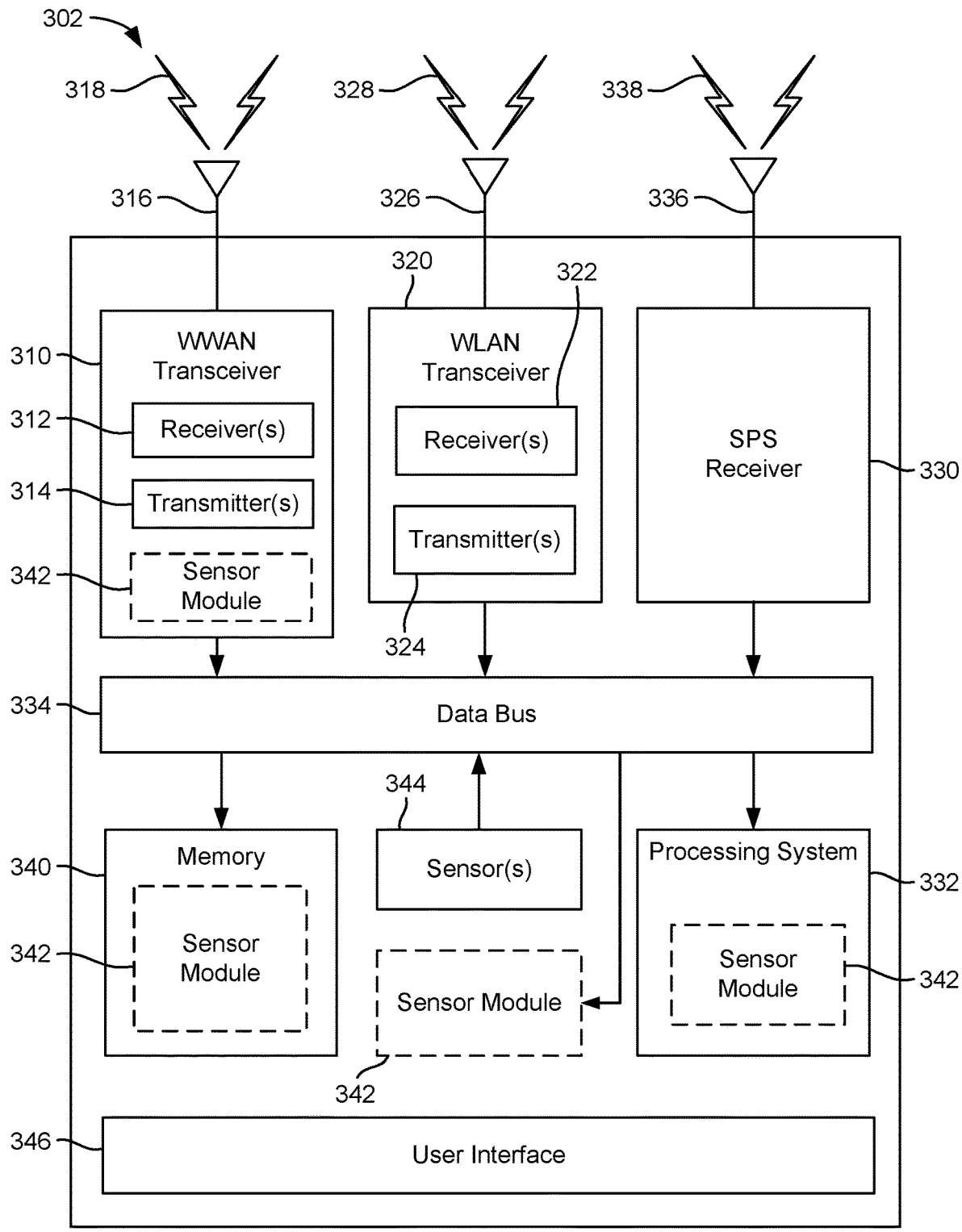
FIGS. 3A to 3C are simplified block diagrams of several sample aspects of components that may be employed in a user equipment (UE), a base station, and a network entity, respectively, and configured to support communications as taught herein.
Figure 3B:
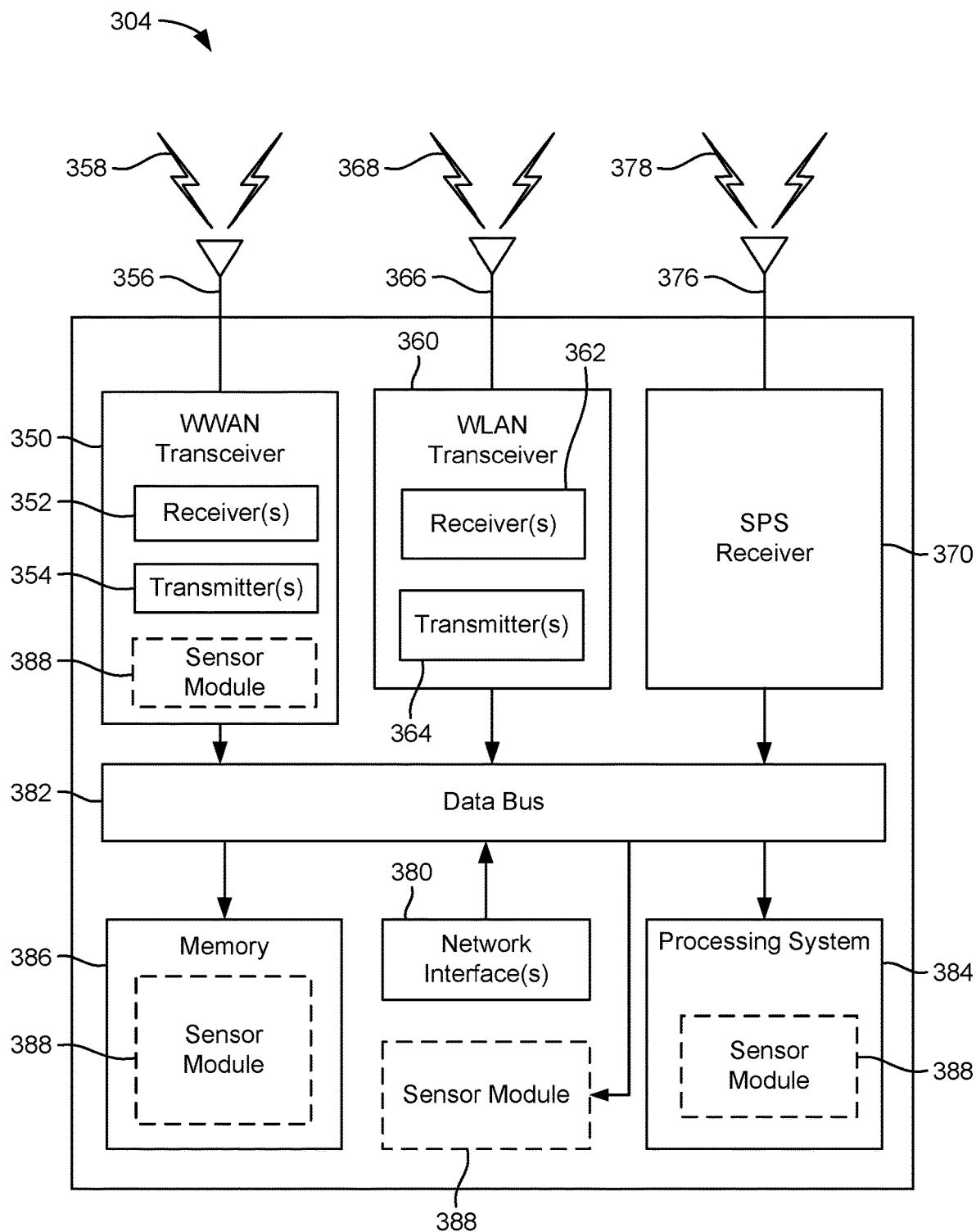
Figure 3C:
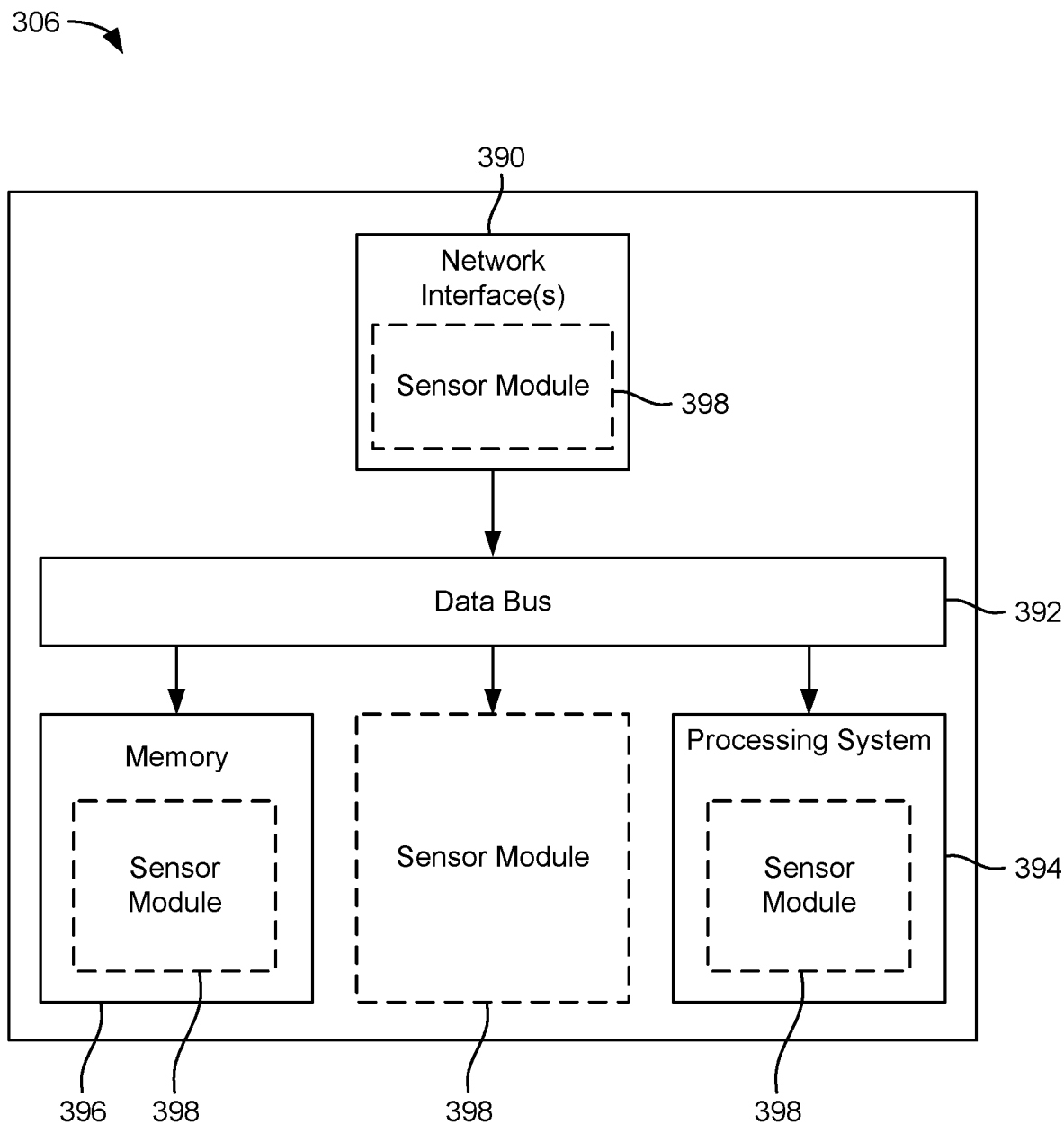

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signal 318 and signal 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the WLAN transceivers 320 and 360 include one or more transmitter 324 and transmitter 364, respectively, for transmitting and encoding signal 328 and signal 368, respectively, and one or more receiver 322 and receiver 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receiver 330 and SPS receiver 370. The SPS receivers 330 and 370 may be connected to one or more antennas 336 and antennas 376, respectively, and may provide means for receiving and/or measuring SPS signal 338 and SPS signal 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and perform calculations to determine positions of the UE 302 and the base station 304 using measurements obtained by any suitable SPS algorithm.

The base station 304 and the network entity 306 each include at least one network interfaces 380 and 390, respectively, providing means for communicating (e.g., means for transmitting, means for receiving, etc.) with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, wireless positioning, and for providing other processing functionality. The base station 304 includes a processing system 384 for providing functionality relating to, for example, wireless positioning as disclosed herein, and for providing other processing functionality. The network entity 306 includes a processing system 394 for providing functionality relating to, for example, wireless positioning as disclosed herein, and for providing other processing functionality. The processing systems 332, 384, and 394 may therefore provide means for processing, such as means for determining, means for calculating, means for receiving, means for transmitting, means for indicating, etc. In an aspect, the processing systems 332, 384, and 394 may include, for example, one or more processors, such as one or more general purpose processors, multi-core processors, ASICs, digital signal processors (DSPs), field programmable gate arrays (FPGA), other programmable logic devices or processing circuitry, or various combinations thereof.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). The memory components 340, 386, and 396 may therefore provide means for storing, means for retrieving, means for maintaining, etc. In some cases, the UE 302, the base station 304, and the network entity 306 may include sensor modules 342, 388, and 398, respectively. The sensor modules 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the sensor modules 342, 388, and 398 may be external to the processing systems 332, 384, and 394 (e.g., part of a modem processing system, integrated with another processing system, etc.). Alternatively, the sensor modules 342, 388, and 398 may be memory modules stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein. FIG. 3A illustrates possible locations of the sensor module 342, which may be part of the WWAN transceiver 310, the memory component 340, the processing system 332, or any combination thereof, or may be a standalone component. FIG. 3B illustrates possible locations of the sensor module 388, which may be part of the WWAN transceiver 350, the memory component 386, the processing system 384, or any combination thereof, or may be a standalone component. FIG. 3C illustrates possible locations of the sensor module 398, which may be part of the network interface(s) 390, the memory component 396, the processing system 394, or any combination thereof, or may be a standalone component.

The UE 302 may include one or more sensors 344 coupled to the processing system 332 to provide means for sensing or detecting movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a microelectrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 (L3) and Layer-2 (L2) functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARM), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data bus 334, data bus 382, and data bus 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processing systems 332, 384, 394, the transceivers 310, 320, 350, and 360, the memory components 340, 386, and 396, the sensor modules 342, 388, and 398, etc.

Figure 4:
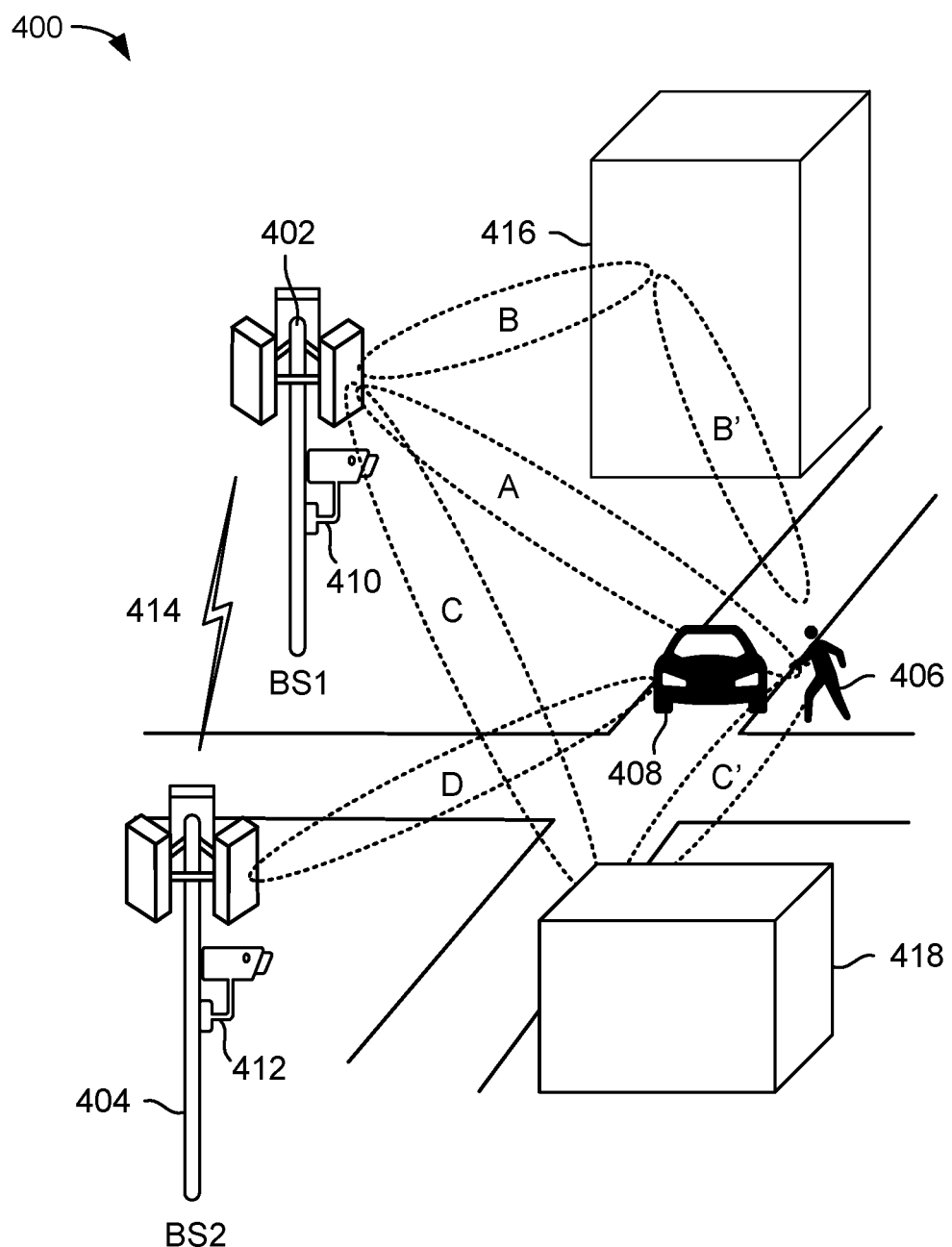
FIG. 4 illustrates a system for implementing NR interference management techniques according to some aspects of the present disclosure.

FIG. 4 illustrates a system 400 for implementing NR interference management techniques according to some aspects of the present disclosure. In FIG. 4, a first BS (BS1) 402 and a second BS (BS2) 404, which may be gNBs or other types of base stations, provide service to entities in a common area, e.g., where there is potential interference between a transmit beam from BS1 402 and a transmit beam from BS2 404. In the example illustrated in FIG. 4, BS1 402 is serving a first UE (UE1) 406 carried by a pedestrian and BS2 404 is serving a second UE (UE2) 408 within a vehicle. In the example illustrated in FIG. 4, each BS has input from a non-5G sensor, such as a video camera or other image sensor, a radar transceiver, a LIDAR device, an ultrasonic rangefinder, or other type of sensor. Although FIG. 4 shows sensor 410 mounted to BS1 402 and sensor 412 mounted to BS2 404, this is illustrative and not limiting: sensor data can be provided by a variety of sources, including, but not limited to, sensors co-located with the BS, sensors not co-located with a BS, sensors within or coupled to the UEs 406 and 408, and so on. BS1 402 and BS2 404 can communicate with each other via wired or wireless link 414. In FIG. 4, BS1 402, BS2 404, or both, are aware of obstacle 416 and obstacle 418, e.g., buildings or other physical structures. In some aspects, information about obstacles 416 and 418 is provided by sensors or derived from data provided by sensors.

In the example illustrated in FIG. 4, BS1 402 determines that it can transmit a beam to UE1 406 directly (beam A), or by reflecting a beam off of obstacle 416 (beam B and its reflected beam B'), or by reflecting a beam off of obstacle 418 (beam C and its reflected beam C'). BS1 402 then determines a planned transmit beam configuration. In this example, BS1 402 determines that beam A has the best signal characteristics, and plans to transmit to the UE1 406 using beam A.

BS2 404 determines that beam D is the best beam to transmit to UE2 408, and notifies BS1 402 of its intent to use beam D to transmit to UE2 408. In this manner, BS1 402 obtains a planned beam configuration of a second BS, i.e., BS2 404's intent to transmit to the UE2 408 via beam D. In some aspects, BS1 402 and BS2 404 may communicate via the Xn interface.

The BS1 402 then determines that a planned transmit beam with interfere with a planned transmit beam from a BS2 404. In this example, BS1 402 determines that beam D from BS2 404 will likely interfere with its beam A.

The BS1 402 then determines a mitigation strategy to reduce or eliminate interference between its own planned transmit beam and the planned transmit beam from BS2 404. A number of mitigation strategies may be used alone or in combination with other mitigation strategies. One mitigation strategy is for BS1 402 to modify its own transmit beam. Another mitigation strategy is for BS1 402 to request BS2 404 to modify a transmit beam of BS2 404. Modifying a transmit beam can include, but is not limited to, changing a transmit power, changing a transmit time, using a different transmit beam, deciding not to transmit at all, or combinations thereof. Thus, a mitigation strategy may involve coordination between base stations, such as where BS2 404 receives a request from BS1 402 to modify a transmit beam that BS2 404 planned to transmit, or the mitigation strategy may not involve coordination between the base stations, such as where BS1 402 unilaterally decides to modify its planned transmit beam coordination. In the example illustrated in FIG. 4, BS1 402 may decide to transmit to the UE1 406 via transmit beam C and its reflected beam C', even though the physical layer characteristics (e.g., RSRP, etc.) are not as good as the physical layer characteristics of beam A.

In the example just described, BS1 402 determines a mitigation strategy and either acts unilaterally or in cooperation with BS2 404 to mitigate potential interference while BS2 404 is a passive recipient of mitigation instructions (if any), but it will be understood that the roles may be reversed, i.e., where BS2 404 detects potential interference and creates, then implements, a mitigation strategy, and where BS1 402 is the passive party. In yet another example, both BS1 402 and BS2 404 may actively check for potential interference and each may create its own mitigation strategy. In this scenario, the two base stations may engage in a negotiation or analysis to determine a mitigation strategy that is acceptable to both. It will be understood that any of the two base stations may be simultaneously engaged in this same interference detection and mitigation activity with another base station. For example, while BS1 402 is engaged in this activity with regard to potential interference from BS2 404, BS1 402 may also be performing the same analysis with regards to potential interference from another base station (e.g., BS3) not shown in FIG. 4.

In some aspects, the mitigation strategy may be based at least in part on environment data collected from sensors. In FIG. 4, for example, BS1 402 may know, based on sensor data, that UE2 408 is travelling in a direction that will cause it to potentially interfere with transmit beam C and its reflected beam C', and thus BS1 402 may choose to use transmit beam B and its reflected beam B' because the projected path of UE2 408 indicates that UE2 408 will not later interfere with transmit beam B and its reflected beam B'. In some aspects, the environment data collected from sensors may include data that describes a physical characteristic of an object, a location or position of an object, a movement or acceleration of an object, an identity of an object, a reflectivity of an object, some other characteristic of an object, or combinations thereof.

Thus, the interference management techniques disclosed herein can include a number of aspects. One aspect is the technique of sharing planned transmit beam configurations among base stations, detecting potential interference between a planned transmit beam of one base station and a planned transmit beam of another base station, and taking steps to mitigate or eliminate the potential interference, which may include a base station modifying its own planned transmit beam configuration, that base station asking another base station to modify its planned transmit beam configuration, or both. The same principles can be applied to pairs of beams transmitted by a single base station, for example, when a changing environment (e.g., moving traffic) creates dynamically changing reflections and beam paths, which may cause beams that did not previously interfere with each other to start interfering with each other: the base station can detect and mitigate potential interference between its own transmit beams as well as between transmit beams from itself and another base station. Another aspect is the use of environment data, including both relatively static and relatively dynamic environment conditions, as part of the process to determine a planned transmit beam configuration, as part of the interference mitigation effort, or both. Yet another aspect is the combination of the aspects described above.

The interference management techniques disclosed herein have several technical advantages. Sharing of planned transmit beam configurations between base stations allows each base station to detect potential interference between each other's transmit beams and take steps to mitigate or eliminate such interference. Considering environment data collected from sensors associated with a base station or with a UE being served by the base station when planning or modifying transmit beam configurations allows a base station to detect potential interference caused by environmental conditions that are not necessarily known to the base station through conventional feedback mechanisms, such as positioning. The interference management techniques just described may be combined to provide a base station with a wealth of additional knowledge that the base station can use to plan or modify transmit beam configurations to reduce interference.

Figure 5:
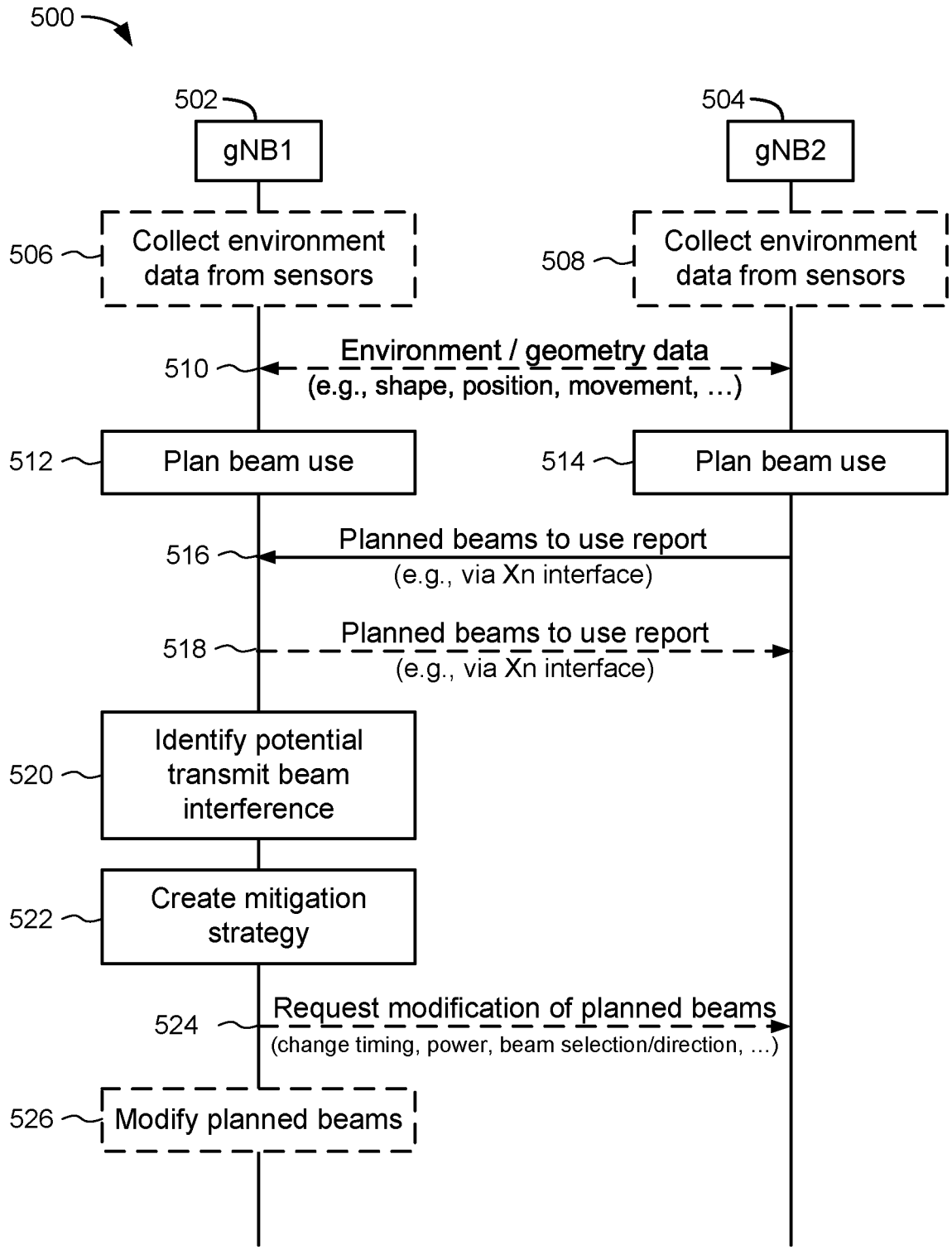
FIGS. 5-9 illustrate methods associated with NR interference management techniques according to some aspects of the present disclosure.

FIG. 5 illustrates a method 500 associated with NR interference management techniques according to some aspects of the present disclosure. FIG. 5, illustrates a scenario involving a first gNB (gNB1) 502 and a second gNB (gNB2) 504. In the example illustrated in FIG. 5, at optional block 506, gNB1 502 may collect environment data from sensors, as may gNB2 504, at optional block 506.

At optional block 510, the gNB1 502 and the gNB2 504 may exchange environment data, with each other. In some aspects, the environment data may include geometry data that describes the size, position, location, or other geometric information about a feature of the environment, e.g., a building, vehicle, or other obstacle, etc. Communication of this data may be one-way (e.g., from gNB2 to gNB1) or two-way.

At 512, gNB1 502 plans its use of transmit beams (e.g., determines a planned transmit beam configuration) and at 514, gNB2 504 plans its use of transmit beams. For example, the gNBs may plan their transmit beam configurations based on physical layer characteristics, e.g., choosing the beam with the best RSRP, signal quality, or other metric, for communication with a target UE.

At 516, gNB2 504 sends its planned transmit beam configuration to gNB1 502. Optionally, at 518, gNB1 502 may convey its planned transmit beam configuration to gNB2 504. In some aspects, this information is communicated directly from gNB to gNB, e.g., via the Xn interface, without involvement of a location server or other core network node.

At 520, gNB1 502 identifies potential transmit beam interference. For example, gNB1 502 may plan to transmit a beam towards a target UE, and may detect that a planned beam from gNB2 504 will be transmitting towards or into that same area at the same time. Likewise, if gNB2 504 has received a planned transmit configuration from gNB1 502, gNB2 504 may also detect the same potential transmit beam interference or other potential transmit beam interference from gNB1 502 or other transmission/reception points (TRPs).

At 522, gNB1 502 determines a mitigation strategy (creates a mitigation plan) to reduce or eliminate the potential transmit beam interference. In some aspects, at 524, gNB1 502 may request gNB2 504 to modify its planned transmit beam configuration. In some aspects, at 526, gNB1 502 may modify its own planned transmit beam configuration. Modifying a planned transmit beam configuration may include changing the transmit power of a beam, changing the timing of a beam, changing the direction of a beam, selecting a different beam from the beam originally selected, or even cancelling transmission of a particular beam.

Figure 6:
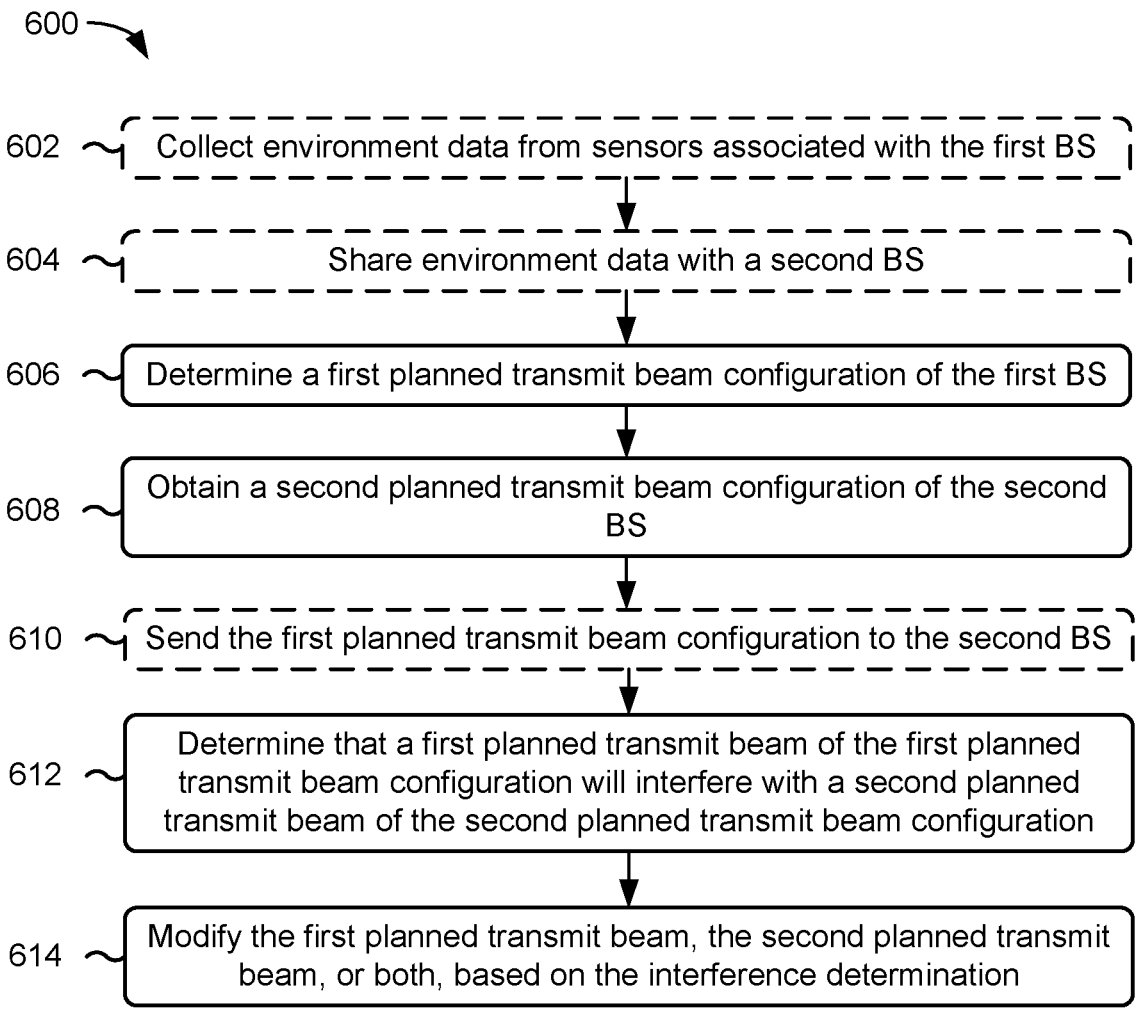

FIG. 6 is a flowchart of an example process 600 associated with interference management techniques. In some implementations, one or more process blocks of FIG. 6 may be performed by a first BS (e.g., BS 102, gNB1 502). In some implementations, one or more process blocks of FIG. 6 may be performed by another device or a group of devices separate from or including the first BS. Additionally, or alternatively, one or more process blocks of FIG. 6 may be performed by one or more components of device 304, such as processing system 385, memory 386, WWAN transceiver 350, WLAN transceiver 360, and network interface 380.

As shown in FIG. 6, process 600 may optionally include collecting environment data from sensors associated with the first BS (block 602). For example, the first BS may collect environment data from sensors coupled to the first BS, from sensors coupled to UEs being served by the first BS, or from other sources associated with the first BS. In some aspects, the environment data may include geometry data that describes the size, position, location, or other geometric information about a feature of the environment, e.g., a building, vehicle, or other obstacle, etc. In some aspects, the environment data collected from the sensors may include data collected from an image sensor, a microphone, a radio detection and ranging (RADAR) device, a light detection and ranging (LIDAR) device, an ultrasonic device, a position detection or sensing device, or combinations thereof. In some aspects, the environment data collected from the sensors may include data that describes a physical characteristic of an object, a location or position of an object, a movement or acceleration of an object, an identity of an object, or combinations thereof.

As further shown in FIG. 6, process 600 may optionally include sharing environment data with a second BS (block 604). For example, the first BS may send its environment data to the second BS, the second BS may send environment data collected from sensors associated with the second BS to the first BS, or both. The environment data received from the second BS may be of the same type or different types compared to the environment data send to the second BS, including, but not limited to, the types of environment data described above with regard to block 602.

As further shown in FIG. 6, process 600 may include determining a first planned transmit beam configuration of the first BS (block 606). In some aspects, the first BS may plan its transmit beam configurations based on physical layer characteristics, e.g., choosing the beam with the best RSRP, signal quality, or other metric, for communication with a target UE.

In some aspects, the first BS may consider the environment data when determining the first planned transmit beam configuration. For example, if environment data indicates the presence of a truck or other moving obstacle, and further indicates that the moving obstacle is now or will soon block a transmission beam to a target UE, the first BS may opt to use a different beam in order to avoid the current or future interference.

As further shown in FIG. 6, process 600 may include obtaining a second planned transmit beam configuration of a second BS (e.g., BS 102, gNB2 504) (block 608). In some aspects, the second planned transmit beam configuration of a second BS is obtained via an Xn interface.

As further shown in FIG. 6, process 600 may optionally include sending the first planned transmit beam configuration to the second BS (block 610). In some aspects, the first planned transmit beam configuration is sent via the Xn interface.

As further shown in FIG. 6, process 600 may include determining that a first planned transmit beam of the first planned transmit beam configuration will interfere with a second planned transmit beam of the second planned transmit beam configuration (block 612). For example, the first BS may determine that a first planned transmit beam of the first planned transmit beam configuration will interfere with a second planned transmit beam of the second planned transmit beam configuration. For example, the first BS may plan to transmit a beam towards a target UE, and may detect that a planned beam from the second BS will be transmitting towards or into that same area at the same time. Likewise, if the second BS has received a planned transmit configuration from the first BS, the second BS may also detect the same potential transmit beam interference or other potential transmit beam interference from the first BS or other transmission/reception points (TRPs).

As further shown in FIG. 6, process 600 may include modifying the first planned transmit beam, the second planned transmit beam, or both, based on the interference determination (block 614). For example, the first BS may modify the first planned transmit beam, the second planned transmit beam, or both, based on the interference determination, as described above. In some aspects, modifying a planned transmit beam may comprise cancelling the planned transmit beam or changing a transmission characteristic of the planned transmit beam. In some aspects, changing the transmission characteristic of the planned transmit beam may comprise changing a transmit power of the planned transmit beam, changing a timing of the planned transmit beam, changing a direction of the planned transmit beam, using a different transmit beam from the planned transmit beam, or combinations thereof. In some aspects, the environment data from the first BS (and from the second BS, if it has been made available to the first BS) may be considered when modifying a transmit beam.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
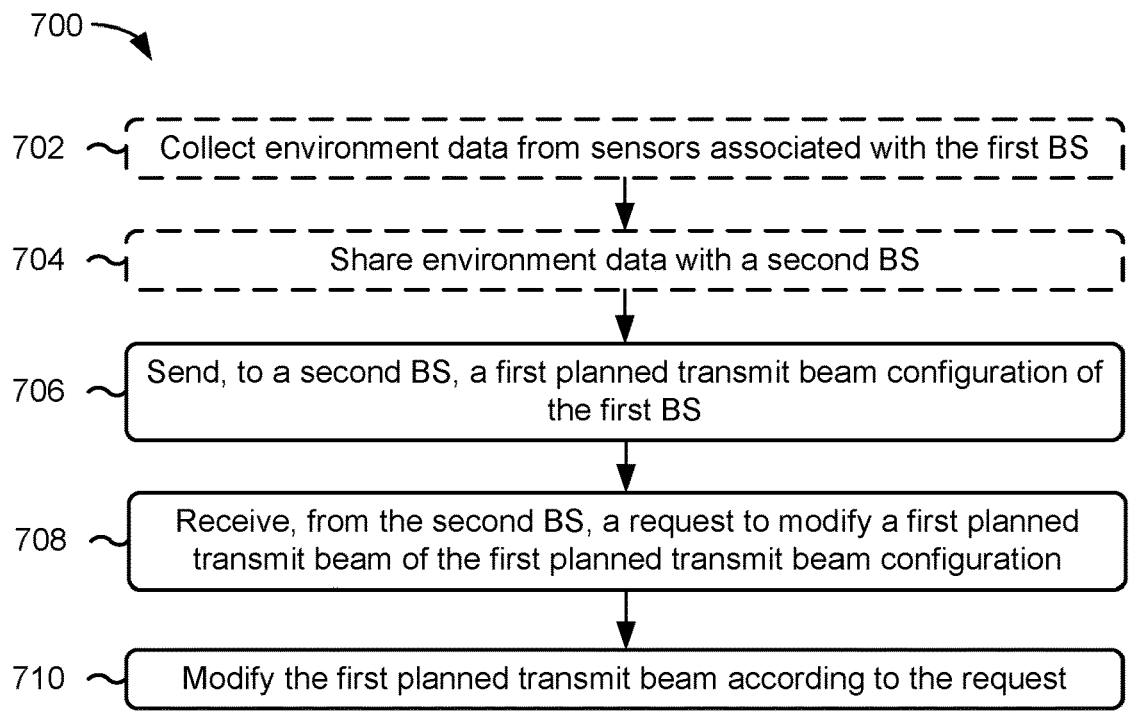

FIG. 7 is a flowchart of an example process 700 associated with interference management techniques. In some implementations, one or more process blocks of FIG. 7 may be performed by a first BS (e.g., BS 102, gNB1 502). In some implementations, one or more process blocks of FIG. 7 may be performed by another device or a group of devices separate from or including the first BS. Additionally, or alternatively, one or more process blocks of FIG. 7 may be performed by one or more components of device 304, such as processing system 385, memory 386, WWAN transceiver 350, WLAN transceiver 360, and network interface 380.

As shown in FIG. 7, process 700 may optionally include collecting environment data from sensors associated with the first BS (block 702). For example, the first BS may collect environment data from sensors coupled to the first BS, from sensors coupled to UEs being served by the first BS, or from other sources associated with the first BS. In some aspects, the environment data may include geometry data that describes the size, position, location, or other geometric information about a feature of the environment, e.g., a building, vehicle, or other obstacle, etc. In some aspects, the environment data collected from the sensors may include data collected from an image sensor, a microphone, a radio detection and ranging (RADAR) device, a light detection and ranging (LIDAR) device, an ultrasonic device, a position detection or sensing device, or combinations thereof. In some aspects, the environment data collected from the sensors may include data that describes a physical characteristic of an object, a location or position of an object, a movement or acceleration of an object, an identity of an object, or combinations thereof.

As further shown in FIG. 7, process 700 may optionally include sharing environment data with a second BS (block 704). For example, the first BS may send its environment data to the second BS, the second BS may send environment data collected from sensors associated with the second BS to the first BS, or both. The environment data received from the second BS may be of the same type or different types compared to the environment data send to the second BS, including, but not limited to, the types of environment data described above with regard to block 704.

As shown in FIG. 7, process 700 may further include sending, to a second BS (e.g., BS 102, gNB2 504), a first planned transmit beam configuration of the first BS (block 706). For example, the first BS may send, to a second BS, a first planned transmit beam configuration of the first BS, as described above. In some aspects, the first planned transmit beam configuration may be sent to the second BS via the Xn interface.

As further shown in FIG. 7, process 700 may include receiving, from the second BS, a request to modify a first planned transmit beam of the first planned transmit beam configuration (block 708). For example, the BS may receive, from the second BS, a request to modify a first planned transmit beam of the first planned transmit beam configuration, as described above. In some aspects, the request to modify a first planned transmit beam of the first planned transmit beam configuration may be received via the Xn interface.

As further shown in FIG. 7, process 700 may include modifying the first planned transmit beam according to the request (block 710). For example, the first BS may modify the first planned transmit beam according to the request, as described above. In some aspects, modifying the first planned transmit beam may include cancelling the first planned transmit beam or changing a transmission characteristic of the first planned transmit beam. In some aspects, changing the transmission characteristic of the first planned transmit beam may include changing a transmit power of the first planned transmit beam, changing a timing of the first planned transmit beam, changing a direction of the first planned transmit beam, using a different transmit beam from the first planned transmit beam, or combinations thereof.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
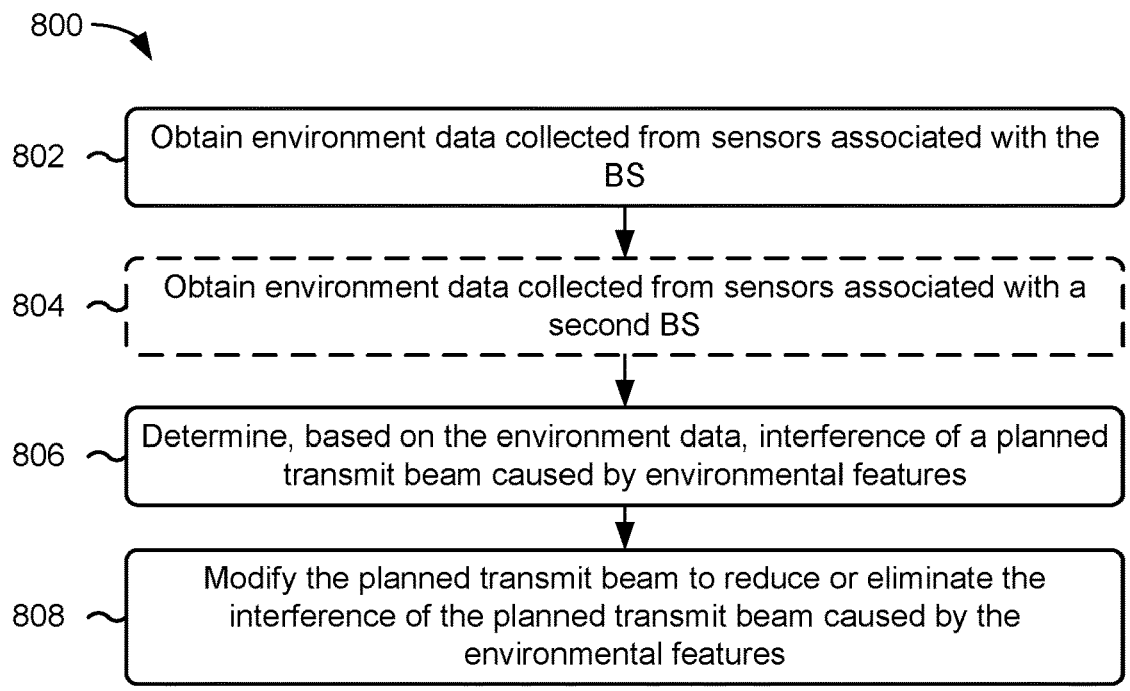

FIG. 8 is a flowchart of an example process 800 associated with interference management techniques. In some implementations, one or more process blocks of FIG. 8 may be performed by a BS (e.g., BS 102, gNB1 502, gNB2 504). In some implementations, one or more process blocks of FIG. 8 may be performed by another device or a group of devices separate from or including the BS. Additionally, or alternatively, one or more process blocks of FIG. 8 may be performed by one or more components of device 304, such as processing system 385, memory 386, WWAN transceiver 350, WLAN transceiver 360, and network interface 380.

As shown in FIG. 8, process 800 may include obtaining environment data collected from sensors associated with the BS (block 802). For example, the BS may obtain environment data collected from sensors associated with the BS, as described above. In some aspects, the environment data is collected from sensors coupled to the first BS, from sensors coupled to a user equipment (UE) served by the first BS, or from combinations thereof. In some aspects, the environment data collected from sensors may include data collected from an image sensor, a microphone, a radio detection and ranging (RADAR) device, a light detection and ranging (LIDAR) device, an ultrasonic device, a position detection or sensing device, or combinations thereof. In some aspects, the environment data collected from sensors may include data that describes a physical characteristic of an object, a location or position of an object, a movement or acceleration of an object, an identity of an object, or combinations thereof.

As further shown in FIG. 8, process 800 may optionally include obtaining environment data collected from sensors associated with a second BS (block 804). For example, the BS may receive environment data from a second BS via the Xn interface.

As further shown in FIG. 8, process 800 may include determining, based on the environment data, interference of a planned transmit beam caused by environmental features (block 806). For example, the BS may determine, based on the environment data, interference of a planned transmit beam caused by environmental features, as described above.

As further shown in FIG. 8, process 800 may include modifying the planned transmit beam to reduce or eliminate the interference of the planned transmit beam caused by the environmental features (block 806). For example, the BS may modify the planned transmit beam to reduce or eliminate the interference of the planned transmit beam caused by environmental features that are static, such as buildings and other sources of reflections, caused by environmental features that are transient, such as automobile, rail, aircraft, or shipping traffic, or caused by environmental features that change slowly, such as weather (rain, snow, fog, high wind) and temperature. In some aspects, modifying the planned transmit beam may include cancelling the planned transmit beam or changing a transmission characteristic of the planned transmit beam. In some aspects, changing the transmission characteristic of the planned transmit beam may include changing a transmit power of the planned transmit beam, changing a timing of the planned transmit beam, changing a direction of the planned transmit beam, using a different transmit beam from the planned transmit beam, or combinations thereof. In aspects where environment data is received from a second BS, the first BS may determine interference based on that environment data as well.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9:
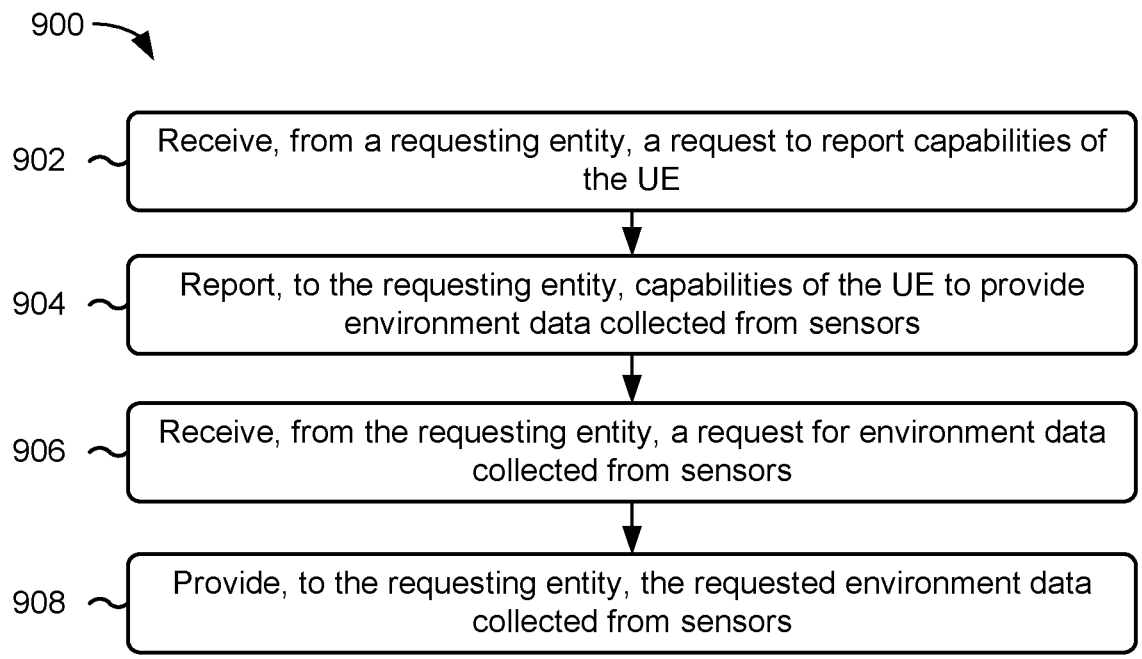

FIG. 9 is a flowchart of an example process 900 associated with interference management techniques. In some implementations, one or more process blocks of FIG. 9 may be performed by a UE (e.g., UE 104, UE 302). In some implementations, one or more process blocks of FIG. 9 may be performed by another device or a group of devices separate from or including the UE. Additionally, or alternatively, one or more process blocks of FIG. 9 may be performed by one or more components of UE 302, such as processing system 332, memory 340, WWAN transceiver 310, WLAN transceiver 320, and user interface 346.

As shown in FIG. 9, process 900 may include receiving, from a requesting entity, a request to report capabilities of the UE (block 902). In some aspects, the requesting entity may comprise a base station, a radio network node, or a core network node. For example, the UE may receive a request from a requesting entity, such as the serving BS, to provide the requesting entity with the UE's capabilities. The request may be a request for a report of capabilities in general, or it may be a request to report sensor capabilities specifically.

As further shown in FIG. 9, process 900 may include reporting, to the requesting entity, capabilities of the UE to provide environment data collected from sensors (block 904). For example, the UE may report to the BS or other requesting entity a list of sensors that the UE possesses, is coupled with, or to which the UE has access; the UE may report a list of sensor data that the UE has access to (whether the UE physically contains that sensor or not); or combinations thereof. Examples of sensors that a UE may possess or have access to include, but are not limited to, an image sensor, a microphone, a radio detection and ranging (RADAR) device, a light detection and ranging (LIDAR) device, an ultrasonic device, a position detection or sensing device, or other type of sensor. In some aspects, the environment data collected from sensors may include data that describes a physical characteristic of an object, a location or position of an object, a movement or acceleration of an object, an identity of an object, or combinations thereof. For example, a UE may be able to provide raw LIDAR range data, descriptions of 3D objects detected using LIDAR, or both. The same concept applies to RADAR or other sensor technologies from which the size, shape, and location of 3D objects may be derived.

As further shown in FIG. 9, process 900 may include receiving, from the requesting entity, a request for environment data collected from sensors (block 906). For example, the UE may receive a request to provide specific sensor data, such as images, current position or location, current movement or motion of the UE or of other object within the UE's environment, and so on, to the B S or other requesting entity. If the UE has indicated that it can also provide environment data, such as a description of three-dimensional objects within the environment, the UE may receive a request to report such object data to the B S or other requesting entity.

As further shown in FIG. 9, process 900 may include providing, to the requesting entity, the requested environment data collected from sensors (block 908). For example, the UE may provide a three-dimensional description of static structures (such as buildings), dynamic structures (such as cars), as well as current position or location, or motion or movement, of those objects, as well as of the UE itself. Likewise, the UE may provide raw sensor data, such as images, sounds, temperature, location, and so on. The requesting entity may then use that sensor and environment data to help determine a transmit beam configuration, a mitigation strategy, or both.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

Figure 10:
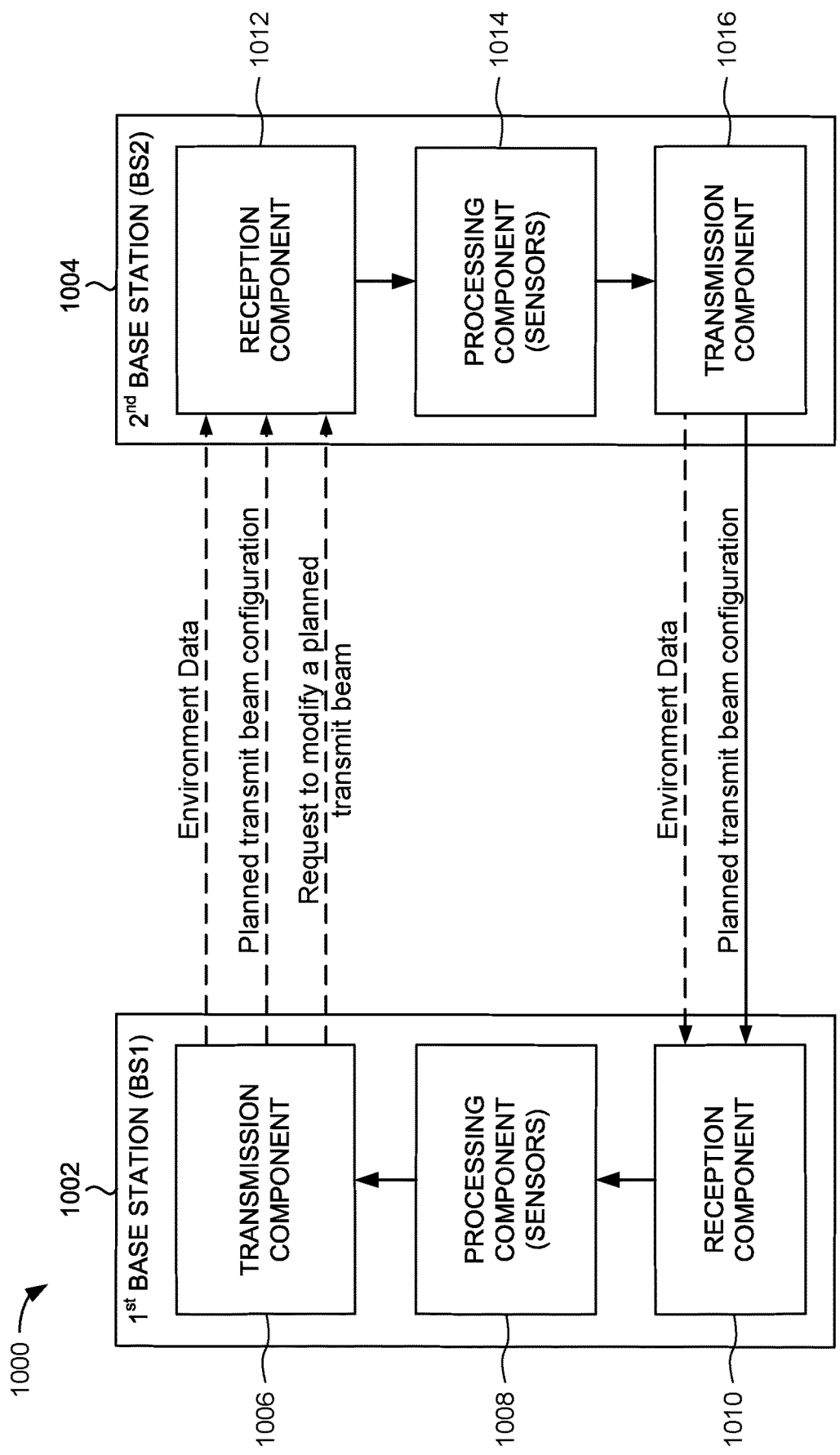
FIGS. 10-11 are conceptual data flow diagrams illustrating the data flow between different means/components in exemplary apparatuses in accordance with some aspects of the disclosure.

FIG. 10 is a conceptual data flow diagram 1000 illustrating the data flow between different means/components in exemplary apparatuses 1002 and 1004 in accordance with an embodiment of the disclosure. The apparatus 1002 and apparatus 1004 may both be base stations (e.g., BS 102, gNB1 502, gBN2 504).

The apparatus 1002 includes a transmission component 1006, which may correspond to transmitter circuitry in device 304 as depicted in FIG. 3B, such as WWAN transmitter(s) 354 or WLAN transmitter(s) 364. The apparatus 1002 further includes a processing component 1008, which may correspond to processor circuitry in device 304 as depicted in FIG. 3B, including processing system 384, etc. The apparatus 1002 further includes a reception component 1010, which may correspond to receiver circuitry in device 304 as depicted in FIG. 3B, such as WWAN receiver(s) 352 or WLAN receivers(s) 362.

The apparatus 1004 includes a reception component 1012, which may correspond to receiver circuitry in device 304 as depicted in FIG. 3B, such as WWAN receiver(s) 352 or WLAN receivers(s) 362. The apparatus 1004 further includes a processing component 1014, which may correspond to processor circuitry in device 304 as depicted in FIG. 3B, including processing system 384, etc. The apparatus 1004 further includes a transmission component 1016, which may correspond to transmitter circuitry in device 304 as depicted in FIG. 3B, such as WWAN transmitter(s) 354 or WLAN transmitter(s) 364.

Referring to FIG. 10, the processing component 1008 optionally collects environment data from sensors that are associated with apparatus 1002, and optionally directs the transmission component 1006 to send environment data to the reception component 1012. The processing component 1014 optionally collects environment data from sensors that are associated with apparatus 1004, and optionally directs the transmission component 1016 to send environment data to the reception component 1010. The processing component 1008 plans transmission beam use, e.g., creating a first planned transmission beam configuration. The processing component 1014 also plans transmission beam use, e.g., creating a second planned transmission beam configuration. The processing component 1008 optionally directs the transmission component 1006 to send the first planned transmission beam configuration to the reception component 1012. The processing component 1014 directs the transmission component 1016 to send the second planned transmission beam configuration to the reception component 1010. The processing component 1008 identifies potential interference between a first transmit beam of the first planned transmission beam configuration and a second transmit beam of the second planned transmission beam configuration, and optionally modifies the first transmit beam, optionally directs the transmission component 1006 to send, to the reception component 1012, a request to modify the second transmit beam, or both.

One or more components of the apparatus 1002 and apparatus 1004 may perform each of the blocks of the algorithm in the aforementioned flowcharts of FIGS. 6-8. As such, each block in the aforementioned flowcharts of FIGS. 6-8 may be performed by a component and the apparatus 1002 and apparatus 1004 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
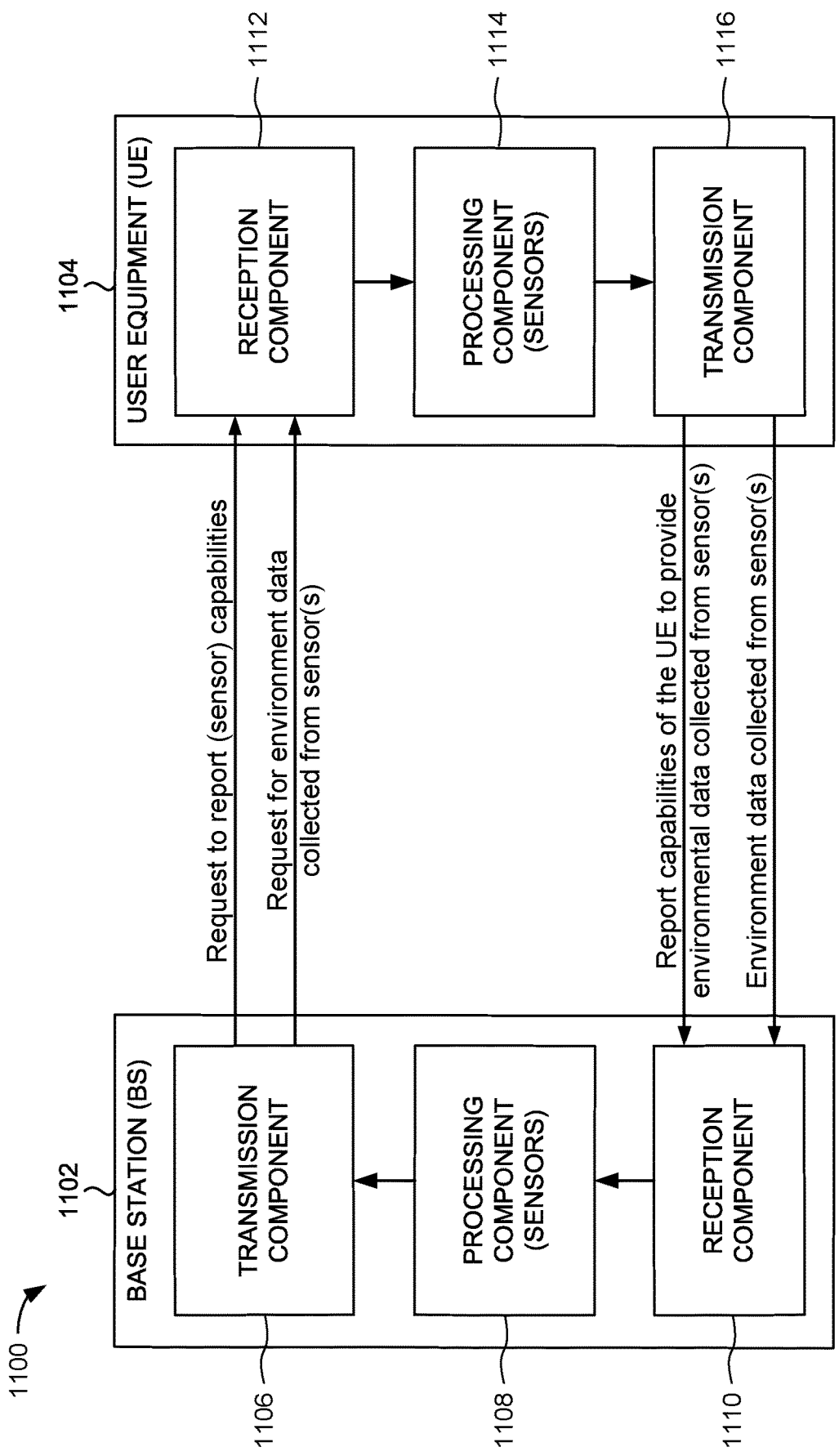

FIG. 11 is a conceptual data flow diagram 1100 illustrating the data flow between different means/components in exemplary apparatuses 1102 and 1104 in accordance with an embodiment of the disclosure. The apparatus 1102 may be a base station (e.g., BS 102, gNB1 502, gBN2 504). The apparatus 1104 may be a UE (e.g., UE 104, UE 302).

The apparatus 1102 includes a transmission component 1106, which may correspond to transmitter circuitry in device 304 as depicted in FIG. 3B, such as WWAN transmitter(s) 354 or WLAN transmitter(s) 364. The apparatus 1102 further includes a processing component 1108, which may correspond to processor circuitry in device 304 as depicted in FIG. 3B, including processing system 384, etc. The apparatus 1102 further includes a reception component 1110, which may correspond to receiver circuitry in device 304 as depicted in FIG. 3B, such as WWAN receiver(s) 352 or WLAN receivers(s) 362.

The apparatus 1104 includes a reception component 1112, which may correspond to receiver circuitry in UE 302 as depicted in FIG. 3A, such as WWAN receiver(s) 312 or WLAN receivers(s) 322. The apparatus 1104 further includes a processing component 1114, which may correspond to processor circuitry in UE 302 as depicted in FIG. 3A, including processing system 332, etc. The apparatus 1104 further includes a transmission component 1116, which may correspond to transmitter circuitry in UE 302 as depicted in FIG. 3A, such as WWAN transmitter(s) 314 or WLAN transmitter(s) 324.

Referring to FIG. 11, the processing component 1108 directs the transmission component 1106 to send, to the reception component 1112, a request to report the capabilities of the apparatus 1104. This request may be a request to report general capabilities or a request to report sensor capabilities specifically. The processing component 1114 directs the transmission component 1116 to send, to the reception component 1110, a report of the capabilities of the apparatus 1104 to provide environment data collected from sensors associated with the apparatus 1104. The processing component 1108 directs the transmission component 1106 to send, to the reception component 1112, a request for environment data collected from sensors associated with the apparatus 1104. This request may specify particular kinds of environment data to be sent by the apparatus 1104. The processing component 1114 directs the transmission component 1116 to send, to the reception component 1110, the requested environment data collected from sensors.

One or more components of the apparatus 1102 may perform each of the blocks of the algorithm in the aforementioned flowcharts of FIGS. 6-8, and one or more components of the apparatus 1104 may perform each of the blocks of the algorithm in the aforementioned flowchart of FIG. 9. As such, each block in the aforementioned flowcharts of FIGS. 6-9 may be performed by a component and the apparatus 1102 and apparatus 1104 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
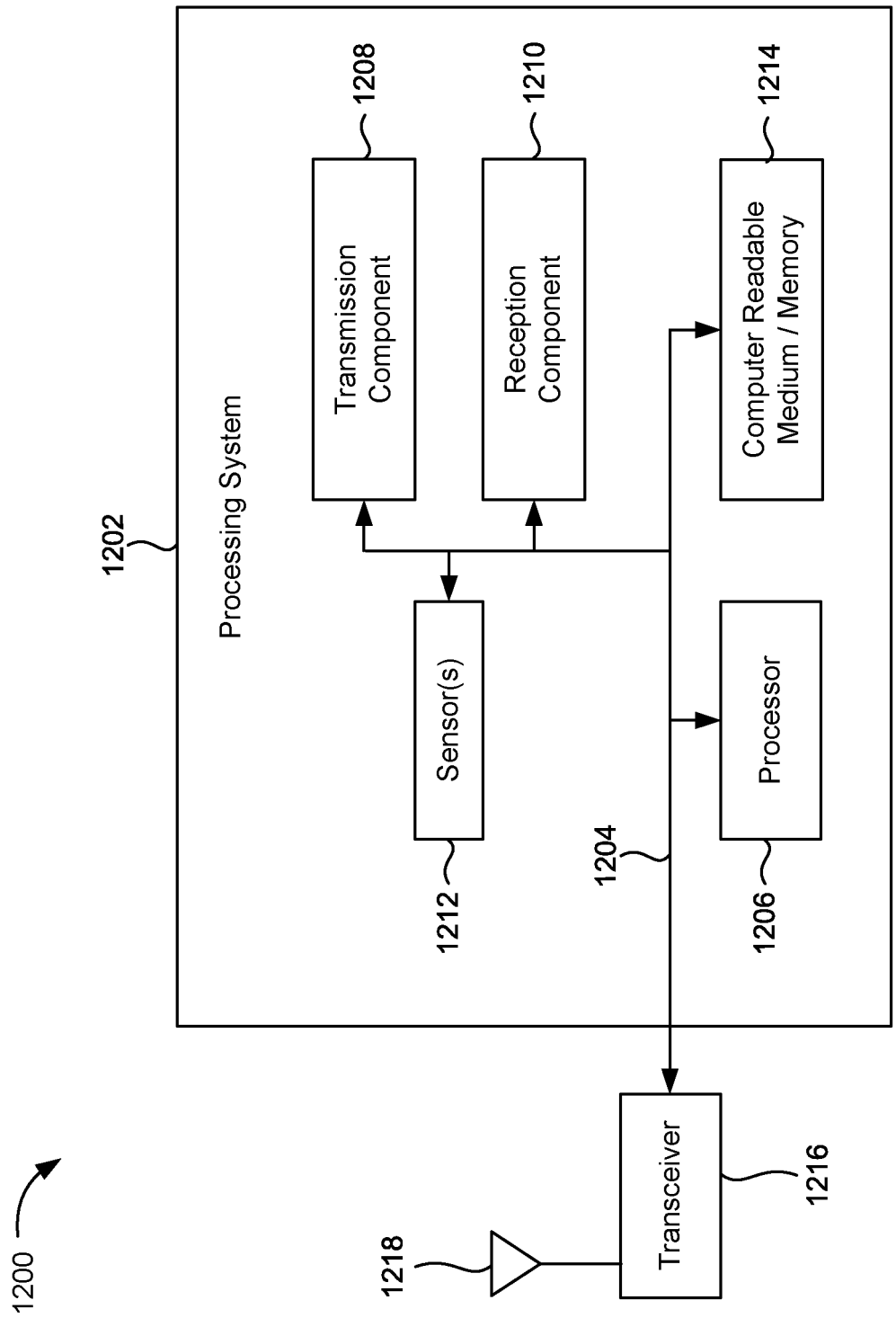
FIGS. 12-13 are diagrams illustrating examples of hardware implementations for an apparatus employing a processing system.

FIG. 12 is a diagram illustrating an example of a hardware implementation for an apparatus 1200 employing a processing system 1202. The processing system 1202 may be implemented with a bus architecture, represented generally by the bus 1204. The bus 1204 may include any number of interconnecting buses and bridges depending on the specific application of the processing system 1202 and the overall design constraints. The bus 1204 links together various circuits including one or more processors and/or hardware components, represented by the processor 1206, a transmission component 1208, a reception component 1210, sensors 1212, and the computer-readable medium/memory 1214. The bus 1204 may also link various other circuits such as timing sources, peripherals, voltage regulators, and power management circuits, which are well known in the art, and therefore, will not be described any further.

The processing system 1202 may be coupled to a transceiver 1216. The transceiver 1216 is coupled to one or more antennas 1218. The transceiver 1216 provides a means for communicating with various other apparatus over a transmission medium. The transceiver 1216 receives a signal from the one or more antennas 1218, extracts information from the received signal, and provides the extracted information to the processing system 1202, specifically the reception component 1210. In addition, the transceiver 1216 receives information from the processing system 1202, specifically the transmission component 1208, and based on the received information, generates a signal to be applied to the one or more antennas 1218. The processing system 1202 includes a processor 1206 coupled to a computer-readable medium/memory 1214. The processor 1206 is responsible for general processing, including the execution of software stored on the computer-readable medium/memory 1214. The software, when executed by the processor 1206, causes the processing system 1202 to perform the various functions described supra for any particular apparatus. The computer-readable medium/memory 1214 may also be used for storing data that is manipulated by the processor 1206 when executing software. The processing system 1202 further includes at least one of the components 1208, 1210 and 1212. The components may be software components running in the processor 1206, resident/stored in the computer readable medium/memory 1214, one or more hardware components coupled to the processor 1206, or some combination thereof. The processing system 1202 may be a component of the BS 102 of FIG. 1, BS 304 of FIG. 3B, gNB1 502 or gNB2 504 of FIG. 5, apparatus 1002 or 1004 of FIG. 10, or apparatus 1102 of FIG. 11.

In one configuration, the apparatus 1200 (e.g., a BS) includes means for determining a first planned transmit beam configuration of the first BS, means for obtaining a second planned transmit beam configuration of a second BS, means for determining that a first planned transmit beam of the first planned transmit beam configuration will interfere with a second planned transmit beam of the second planned transmit beam configuration, and means for modifying the first planned transmit beam, the second planned transmit beam, or both, based on the interference determination.

In another configuration, the apparatus 1200 (e.g., a BS), includes means for sending, to a second BS, a first planned transmit beam configuration of the first BS, means for receiving, from the second BS, a request to modify a first planned transmit beam of the first planned transmit beam configuration, and means for modifying the first planned transmit beam according to the request.

In another configuration, the apparatus 1200 (e.g., a BS), includes means for obtaining environment data collected from sensors associated with the BS, means for determining, based on the environment data, interference of a planned transmit beam caused by environmental features, and means for modifying the planned transmit beam to reduce or eliminate the interference of the planned transmit beam caused by the environmental features.

The aforementioned means may be one or more of the aforementioned components of the apparatus 1200 and/or the processing system 1202 of the apparatus 1200 configured to perform the functions recited by the aforementioned means. As described supra, the processing system 1202 may include the processor 1206, the transmission component 1208, the reception component 1210, the sensor(s) 1212, and the computer readable medium/memory 1214.

Figure 13:
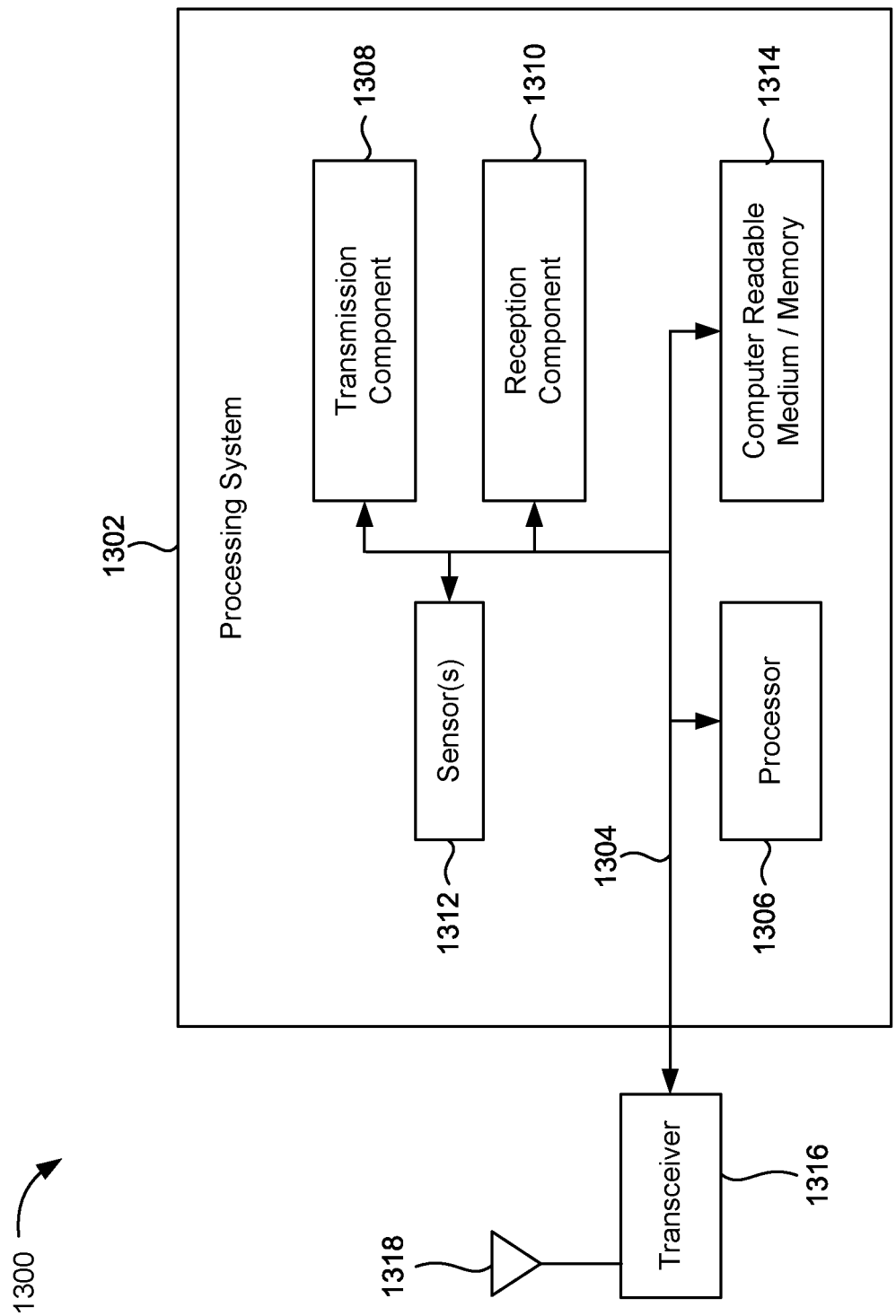

FIG. 13 is a diagram illustrating an example of a hardware implementation for an apparatus 1300 employing a processing system 1302. The processing system 1302 may be implemented with a bus architecture, represented generally by the bus 1304. The bus 1304 may include any number of interconnecting buses and bridges depending on the specific application of the processing system 1302 and the overall design constraints. The bus 1304 links together various circuits including one or more processors and/or hardware components, represented by the processor 1306, a transmission component 1308, a reception component 1310, sensors 1312, and the computer-readable medium/memory 1314. The bus 1304 may also link various other circuits such as timing sources, peripherals, voltage regulators, and power management circuits, which are well known in the art, and therefore, will not be described any further.

The processing system 1302 may be coupled to a transceiver 1316. The transceiver 1316 is coupled to one or more antennas 1318. The transceiver 1316 provides a means for communicating with various other apparatus over a transmission medium. The transceiver 1316 receives a signal from the one or more antennas 1318, extracts information from the received signal, and provides the extracted information to the processing system 1302, specifically the reception component 1310. In addition, the transceiver 1316 receives information from the processing system 1302, specifically the transmission component 1308, and based on the received information, generates a signal to be applied to the one or more antennas 1318. The processing system 1302 includes a processor 1306 coupled to a computer-readable medium/memory 1314. The processor 1306 is responsible for general processing, including the execution of software stored on the computer-readable medium/memory 1314. The software, when executed by the processor 1306, causes the processing system 1302 to perform the various functions described supra for any particular apparatus. The computer-readable medium/memory 1314 may also be used for storing data that is manipulated by the processor 1306 when executing software. The processing system 1302 further includes at least one of the components 1308, 1310 and 1312. The components may be software components running in the processor 1306, resident/stored in the computer readable medium/memory 1314, one or more hardware components coupled to the processor 1306, or some combination thereof. The processing system 1302 may be a component of the UE 104 of FIG. 1, UE 302 of FIG. 3A, or apparatus 1104 of FIG. 11.

In one configuration, the apparatus 1300 (e.g., a UE) includes means for receiving, from a requesting entity, a request to report capabilities of the UE, means for reporting, to the requesting entity, capabilities of the UE to provide environment data collected from sensors, means for receiving, from the requesting entity, a request for environment data collected from sensors, and means for providing, to the requesting entity, the requested environment data collected from sensors.

The aforementioned means may be one or more of the aforementioned components of the apparatus 1300 and/or the processing system 1302 of the apparatus 1300 configured to perform the functions recited by the aforementioned means. As described supra, the processing system 1302 may include the processor 1306, the transmission component 1308, the reception component 1310, the sensor(s) 1312, and the computer readable medium/memory 1314.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a first BS, the method comprising: determining a first planned transmit beam configuration of the first BS; obtaining a second planned transmit beam configuration of a second BS; determining that a first planned transmit beam of the first planned transmit beam configuration will interfere with a second planned transmit beam of the second planned transmit beam configuration; and modifying the first planned transmit beam, the second planned transmit beam, or both, based on the interference determination.

Clause 2. The method of clause 1, wherein modifying the first or second planned transmit beam comprises cancelling the first or second planned transmit beam or changing a transmission characteristic of the first or second planned transmit beam.

Clause 3. The method of clause 2, wherein changing the transmission characteristic of the first or second planned transmit beam comprises changing a transmit power of the first or second planned transmit beam, changing a timing of the first or second planned transmit beam, changing a direction of the first or second planned transmit beam, using a different transmit beam from the first or second planned transmit beam, or combinations thereof.

Clause 4. The method of any of clauses 1 to 3, wherein the planned transmit beam configuration of a second BS is obtained via an Xn interface.

Clause 5. The method of any of clauses 1 to 4, wherein at least one of: determining the first planned transmit beam configuration; and modifying the first planned transmit beam, the second planned transmit beam; or both, is based at least in part on environment data collected from sensors associated with the first BS.

Clause 6. The method of clause 5, further comprising: transmitting the environment data collected from the sensors to the second BS.

Clause 7. The method of any of clauses 5 to 6, wherein the environment data is collected from sensors coupled to the first BS, from sensors coupled to a UE served by the first BS, or from combinations thereof.

Clause 8. The method of any of clauses 5 to 7, wherein the environment data collected from the sensors comprises data collected from an image sensor, a microphone, a RADAR device, a LIDAR device, an ultrasonic device, a position detection or sensing device, or combinations thereof.

Clause 9. The method of any of clauses 5 to 8, wherein the environment data collected from the sensors comprises data that describes a physical characteristic of an object, a location or position of an object, a movement or acceleration of an object, an identity of an object, or combinations thereof.

Clause 10. A method of wireless communication performed by a first BS, the method comprising: sending, to a second BS, a first planned transmit beam configuration of the first BS; receiving, from the second BS, a request to modify a first planned transmit beam of the first planned transmit beam configuration; and modifying the first planned transmit beam according to the request.

Clause 11. The method of clause 10, wherein modifying the first planned transmit beam comprises cancelling the first planned transmit beam or changing a transmission characteristic of the first planned transmit beam.

Clause 12. The method of clause 11, wherein changing the transmission characteristic of the first planned transmit beam comprises changing a transmit power of the first planned transmit beam, changing a timing of the first planned transmit beam, changing a direction of the first planned transmit beam, using a different transmit beam from the first planned transmit beam, or combinations thereof.

Clause 13. The method of any of clauses 10 to 12, wherein the first planned transmit beam configuration is sent to the second BS via an Xn interface.

Clause 14. The method of clause 13, further comprising: collecting environment data from sensors associated with the first B S; and transmitting the environment data collected from the sensors to the second BS.

Clause 15. The method of clause 14, wherein the environment data is collected from sensors coupled to the first BS, from sensors coupled to a UE served by the first BS, or from combinations thereof.

Clause 16. The method of any of clauses 14 to 15, wherein the environment data collected from the sensors comprises data collected from an image sensor, a microphone, a RADAR device, a LIDAR device, an ultrasonic device, a position detection or sensing device, or combinations thereof.

Clause 17. The method of any of clauses 14 to 16, wherein the environment data collected from the sensors comprises data that describes a physical characteristic of an object, a location or position of an object, a movement or acceleration of an object, an identity of an object, or combinations thereof.

Clause 18. A method of wireless communication performed by a BS, the method comprising: obtaining environment data collected from sensors associated with the BS; determining, based on the environment data, interference of a planned transmit beam caused by environmental features; and modifying the planned transmit beam to reduce or eliminate the interference of the planned transmit beam caused by the environmental features.

Clause 19. The method of clause 18, wherein modifying the planned transmit beam comprises cancelling the planned transmit beam or changing a transmission characteristic of the planned transmit beam.

Clause 20. The method of clause 19, wherein changing the transmission characteristic of the planned transmit beam comprises changing a transmit power of the planned transmit beam, changing a timing of the planned transmit beam, changing a direction of the planned transmit beam, using a different transmit beam from the planned transmit beam, or combinations thereof.

Clause 21. The method of any of clauses 18 to 20, wherein the environment data is collected from sensors coupled to the first BS, from sensors coupled to a UE served by the first BS, or from combinations thereof.

Clause 22. The method of clause 21, wherein the environment data collected from sensors comprises data collected from an image sensor, a microphone, a RADAR device, a LIDAR device, an ultrasonic device, a position detection or sensing device, or combinations thereof.

Clause 23. The method of any of clauses 21 to 22, wherein the environment data collected from sensors comprises data that describes a physical characteristic of an object, a location or position of an object, a movement or acceleration of an object, an identity of an object, or combinations thereof.

Clause 24. The method of any of clauses 18 to 23, further comprising: obtaining environment data collected from sensors associated with a second BS, wherein interference of the planned transmit beam caused by environmental factors is determined based on the environment data associated with the first BS, environment data associated with the second BS, or both.

Clause 25. A method of wireless communication performed by a UE, the method comprising: receiving, from a requesting entity, a request to report capabilities of the UE; reporting, to the requesting entity, capabilities of the UE to provide environment data collected from sensors; receiving, from the requesting entity, a request for environment data collected from sensors; and providing, to the requesting entity, the requested environment data collected from sensors.

Clause 26. The method of clause 25, wherein the requesting entity comprises a base station, a radio network node, or a core network node.

Clause 27. The method of any of clauses 25 to 26, wherein the environment data collected from sensors comprises data collected from an image sensor, a microphone, a RADAR device, a LIDAR device, an ultrasonic device, a position detection or sensing device, or combinations thereof.

Clause 28. The method of any of clauses 25 to 27, wherein the environment data collected from sensors comprises data that describes a physical characteristic of an object, a location or position of an object, a movement or acceleration of an object, an identity of an object, or combinations thereof.

Clause 29. An apparatus comprising a memory and at least one processor communicatively coupled to the memory, the memory and the at least one processor configured to perform a method according to any of clauses 1 to 28.

Clause 30. An apparatus comprising means for performing a method according to any of clauses 1 to 28.

Clause 31. A non-transitory computer-readable medium storing computer-executable instructions, the computer-executable comprising at least one instruction for causing a computer or processor to perform a method according to any of clauses 1 to 28.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such aspect decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a first base station (BS), the method comprising:
determining a first planned transmit beam configuration of the first BS based at least in part on environment data collected from sensors associated with the first BS, from sensors coupled to a user equipment (UE) served by the first BS, or from combinations thereof;
obtaining a second planned transmit beam configuration of a second BS;
determining that a first planned transmit beam of the first planned transmit beam configuration will interfere with a second planned transmit beam of the second planned transmit beam configuration; and
modifying the first planned transmit beam, the second planned transmit beam, or both, based on the interference determination.

2. The method of claim 1, wherein modifying the first or second planned transmit beam comprises cancelling the first or second planned transmit beam or changing a transmission characteristic of the first or second planned transmit beam.

3. The method of claim 2, wherein changing the transmission characteristic of the first or second planned transmit beam comprises changing a transmit power of the first or second planned transmit beam, changing a timing of the first or second planned transmit beam, changing a direction of the first or second planned transmit beam, using a different transmit beam from the first or second planned transmit beam, or combinations thereof.

4. The method of claim 1, wherein the planned transmit beam configuration of a second BS is obtained via an Xn interface.

5. The method of claim 1, wherein modifying the first planned transmit beam, the second planned transmit beam or both, is based at least in part on the environment data.

6. The method of claim 5, wherein the environment data comprises data that describes a physical characteristic of an object, a location or position of an object, a movement or acceleration of an object, an identity of an object, or combinations thereof.

7. The method of claim 1, further comprising transmitting the environment data to the second BS.

8. The method of claim 1, wherein the environment data comprises data collected from an image sensor, a microphone, a radio detection and ranging (RADAR) device, a light detection and ranging (LIDAR) device, an ultrasonic device, a position detection or sensing device, or combinations thereof.

9. A method of wireless communication performed by a first base station (BS), the method comprising:
  sending, to a second BS, a first planned transmit beam configuration of the first BS based at least in part on environment data collected from sensors associated with the first BS, from sensors coupled to a user equipment (UE) served by the first BS, or from combinations thereof;
  receiving, from the second BS, a request to modify a first planned transmit beam of the first planned transmit beam configuration; and
  modifying the first planned transmit beam according to the request.

10. The method of claim 9, wherein modifying the first planned transmit beam comprises cancelling the first planned transmit beam or changing a transmission characteristic of the first planned transmit beam.

11. The method of claim 10, wherein changing the transmission characteristic of the first planned transmit beam comprises changing a transmit power of the first planned transmit beam, changing a timing of the first planned transmit beam, changing a direction of the first planned transmit beam, using a different transmit beam from the first planned transmit beam, or combinations thereof.

12. The method of claim 9, wherein the first planned transmit beam configuration is sent to the second BS via an Xn interface.

13. The method of claim 10, further comprising transmitting the environment data to the second BS.

14. The method of claim 13, wherein the environment data comprises data that describes a physical characteristic of an object, a location or position of an object, a movement or acceleration of an object, an identity of an object, or combinations thereof.

15. The method of claim 9, wherein the environment data comprises data collected from an image sensor, a microphone, a radio detection and ranging (RADAR) device, a light detection and ranging (LIDAR) device, an ultrasonic device, a position detection or sensing device, or combinations thereof.

16. A method of wireless communication performed by a first base station (BS), the method comprising:
  obtaining environment data collected from sensors associated with the first BS, from sensors coupled to a user equipment (UE) served by the first BS, or from combinations thereof; and
  determining a first planned transmit beam configuration of the first BS based at least in part on the environment data.

17. The method of claim 16, further comprising:
  determining, based on the environment data, interference of a planned transmit beam caused by environmental features; and
  modifying the planned transmit beam to reduce or eliminate the interference of the planned transmit beam caused by the environmental features.

18. The method of claim 17, wherein modifying the planned transmit beam comprises cancelling the planned transmit beam or changing a transmission characteristic of the planned transmit beam.

19. The method of claim 18, wherein changing the transmission characteristic of the planned transmit beam comprises changing a transmit power of the planned transmit beam, changing a timing of the planned transmit beam, changing a direction of the planned transmit beam, using a different transmit beam from the planned transmit beam, or combinations thereof.

20. The method of claim 19, wherein the environment data comprises data collected from an image sensor, a microphone, a radio detection and ranging (RADAR) device, a light detection and ranging (LIDAR) device, an ultrasonic device, a position detection or sensing device, or combinations thereof.

21. The method of claim 19, wherein the environment data comprises data that describes a physical characteristic of an object, a location or position of an object, a movement or acceleration of an object, an identity of an object, or combinations thereof.

22. The method of claim 16, further comprising:
  obtaining environment data collected from sensors associated with a second BS,
  wherein interference of the planned transmit beam caused by environmental factors is determined based on the environment data associated with the first BS, environment data associated with the second BS, or both.

23. A method of wireless communication performed by a user equipment (UE), the method comprising:
  receiving, from a requesting entity, a request to report capabilities of the UE;
  reporting, to the requesting entity, capabilities of the UE to provide environment data collected from sensors;
  receiving, from the requesting entity, a request for environment data collected from sensors; and
  providing, to the requesting entity, the requested environment data collected from sensors.

24. The method of claim 23, wherein the requesting entity comprises a base station, a radio network node, or a core network node.

25. The method of claim 23, wherein the environment data collected from sensors comprises data collected from an image sensor, a microphone, a radio detection and ranging (RADAR) device, a light detection and ranging (LIDAR) device, an ultrasonic device, a position detection or sensing device, or combinations thereof.

26. The method of claim 23, wherein the environment data collected from sensors comprises data that describes a physical characteristic of an object, a location or position of an object, a movement or acceleration of an object, an identity of an object, or combinations thereof.

27. A first base station (BS), comprising:
a memory;
at least one transceiver; and
at least one processor communicatively coupled to the memory and the at least one transceiver, the at least one processor configured to:
   determine a first planned transmit beam configuration of the first BS based at least in part on environment data collected from sensors associated with the first BS, from sensors coupled to a user equipment (UE) served by the first BS, or from combinations thereof;
   obtain a second planned transmit beam configuration of a second BS;
   determine that a first planned transmit beam of the first planned transmit beam configuration will interfere with a second planned transmit beam of the second planned transmit beam configuration; and
   modify the first planned transmit beam, the second planned transmit beam, or both, based on the interference determination.

28. A first base station (BS), comprising:
a memory;
at least one transceiver; and
at least one processor communicatively coupled to the memory and the at least one transceiver, the at least one processor configured to:
   send, to a second BS via the at least one transceiver, a first planned transmit beam configuration of the first BS based at least in part on environment data collected from sensors associated with the first BS, from sensors coupled to a user equipment (UE) served by the first BS, or from combinations thereof;
   receive, from the second BS via the at least one transceiver, a request to modify a first planned transmit beam of the first planned transmit beam configuration; and
   modify the first planned transmit beam according to the request.

29. A base station (BS), comprising:
a memory;
at least one transceiver; and
at least one processor communicatively coupled to the memory and the at least one transceiver, the at least one processor configured to:
   obtain environment data collected from sensors associated with the BS, from sensors coupled to a user equipment (UE) served by the BS, or from combinations thereof; and
   determine a first planned transmit beam configuration of the BS based at least in part on the environment data.

30. A user equipment (UE), comprising:
a memory;
at least one transceiver; and
at least one processor communicatively coupled to the memory and the at least one transceiver, the at least one processor configured to:
   receive, from a requesting entity via the at least one transceiver, a request to report capabilities of the UE;
   report, to the requesting entity via the at least one transceiver, capabilities of the UE to provide environment data collected from sensors;
   receive, from the requesting entity via the at least one transceiver, a request for environment data collected from sensors; and
   provide, to the requesting entity via the at least one transceiver, the requested environment data collected from sensors.

31. A non-transitory computer-readable medium storing computer-executable instructions that, when executed by a first base station (BS), cause the first BS to:
   determine a first planned transmit beam configuration of the first BS based at least in part on environment data collected from sensors associated with the first BS, from sensors coupled to a user equipment (UE) served by the first BS, or from combinations thereof;
   obtain a second planned transmit beam configuration of a second BS;
   determine that a first planned transmit beam of the first planned transmit beam configuration will interfere with a second planned transmit beam of the second planned transmit beam configuration; and
   modify the first planned transmit beam, the second planned transmit beam, or both, based on the interference determination.

32. A non-transitory computer-readable medium storing computer-executable instructions that, when executed by a first base station (BS), cause the first BS to:
   send, to a second BS, a first planned transmit beam configuration of the first BS based at least in part on environment data collected from sensors associated with the first BS, from sensors coupled to a user equipment (UE) served by the first BS, or from combinations thereof;
   receive, from the second BS, a request to modify a first planned transmit beam of the first planned transmit beam configuration; and
   modify the first planned transmit beam according to the request.

33. A non-transitory computer-readable medium storing computer-executable instructions that, when executed by a base station (BS), cause the BS to:
   obtain environment data collected from sensors associated with the BS, from sensors coupled to a user equipment (UE) served by the BS, or from combinations thereof; and
   determine a first planned transmit beam configuration of the BS based at least in part on the environment data.

34. A non-transitory computer-readable medium storing computer-executable instructions that, when executed by a user equipment (UE), cause the UE to:
   receive, from a requesting entity, a request to report capabilities of the UE;
   report, to the requesting entity, capabilities of the UE to provide environment data collected from sensors;
   receive, from the requesting entity, a request for environment data collected from sensors;
   and provide, to the requesting entity, the requested environment data collected from sensors.

* * * * *